United States Patent
Sheridan et al.

(10) Patent No.: US 9,346,979 B2
(45) Date of Patent: *May 24, 2016

(54) MULTI-LAYER ASSEMBLY, MULTI-LAYER STRETCH RELEASING PRESSURE-SENSITIVE ADHESIVE ASSEMBLY, AND METHODS OF MAKING AND USING THE SAME

(71) Applicant: 3M INNOVATIVE PROPERTIES COMPANY, St. Paul, MN (US)

(72) Inventors: Mary M Sheridan, Woodbury, MN (US); James L. Bries, Cottage Grove, MN (US); Jeffrey D. Malmer, Mahtomedi, MN (US)

(73) Assignee: 3M Innovative Properties Company, St. Paul, MN (US)

(*) Notice: Subject to any disclaimer, the term of this patent is extended or adjusted under 35 U.S.C. 154(b) by 71 days.

This patent is subject to a terminal disclaimer.

(21) Appl. No.: 13/677,855

(22) Filed: Nov. 15, 2012

(65) Prior Publication Data

US 2013/0075027 A1    Mar. 28, 2013

Related U.S. Application Data

(63) Continuation of application No. 11/747,443, filed on May 11, 2007, now Pat. No. 8,334,037.

(51) Int. Cl.
*C09J 7/02* (2006.01)
*B32B 27/00* (2006.01)
*B32B 38/10* (2006.01)

(52) U.S. Cl.
CPC ............... *C09J 7/0228* (2013.01); *B32B 27/00* (2013.01); *B32B 38/10* (2013.01); *C09J 7/0296* (2013.01);

(Continued)

(58) Field of Classification Search
CPC ... C09J 7/0228; C09J 2201/36; C09J 2201/40
See application file for complete search history.

(56) References Cited

U.S. PATENT DOCUMENTS 3,509,991 A   5/1970  Hurst
4,024,312 A   5/1977  Korpman
(Continued)

FOREIGN PATENT DOCUMENTS

JP    2003-238908    8/2003
WO    WO-95/06691   3/1995

OTHER PUBLICATIONS

Momentive, Technical Data Sheet for SILFORCE FSR-2000, available at http://www.momentive.com/Products/ShowTechnicalDataSheet.aspx?id=10867 (accessed Sep. 11, 2013).*

(Continued)

*Primary Examiner* — Scott R Walshon
(74) *Attorney, Agent, or Firm* — Jeffrey M. Olofson

(57) ABSTRACT

A multi-layer assembly that includes a release liner, a first layer disposed on the release liner, the first layer including a pressure-sensitive adhesive composition that includes a silicone polymer that includes silicone polyurea block copolymers, polydiorganosiloxane polymers, or combinations thereof, a second layer disposed on the first layer, the second layer including a composition that includes an elastomer, the composition of the second layer being different from the pressure-sensitive adhesive composition of the first layer, the first layer of the multi-layer assembly exhibiting a release force to the release liner of no greater than 100 gram per 0.5 inch width after the multi-layer assembly has been stored for 46 days at 120° F.

15 Claims, 7 Drawing Sheets

(52) U.S. Cl.
CPC .......... *C09J 2201/36* (2013.01); *C09J 2201/40* (2013.01); *C09J 2400/243* (2013.01); *C09J 2453/00* (2013.01); *C09J 2475/00* (2013.01); *Y10T 156/10* (2015.01); *Y10T 428/14* (2015.01); *Y10T 428/1429* (2015.01); *Y10T 428/1462* (2015.01); *Y10T 428/1476* (2015.01); *Y10T 428/1481* (2015.01)

(56) References Cited

U.S. PATENT DOCUMENTS

| | | |
|---|---|---|
| 4,889,753 A | 12/1989 | Brown |
| 5,082,706 A | 1/1992 | Tangney |
| 5,290,615 A | 3/1994 | Tushaus |
| 5,516,581 A | 5/1996 | Kreckel et al. |
| 5,520,978 A | 5/1996 | Boardman |
| 5,578,381 A | 11/1996 | Hamada et al. |
| 5,593,759 A | 1/1997 | Vargas et al. |
| 5,897,949 A | 4/1999 | Luhmann et al. |
| 6,001,471 A | 12/1999 | Bries et al. |
| 6,045,895 A | 4/2000 | Hyde et al. |
| 6,280,840 B1 | 8/2001 | Lühmann et al. |
| 6,284,378 B1 | 9/2001 | Junghans et al. |
| 6,403,206 B1 | 6/2002 | Bries et al. |
| 6,503,621 B1 | 1/2003 | Ma |
| 6,521,309 B1 * | 2/2003 | Chen et al. ................... 428/40.1 |
| 6,569,521 B1 | 5/2003 | Sheridan et al. |
| 6,572,945 B2 | 6/2003 | Bries et al. |
| 6,841,241 B2 | 1/2005 | Lühmann et al. |
| 6,846,893 B1 | 1/2005 | Sherman et al. |
| 6,866,928 B2 | 3/2005 | Narum et al. |
| 6,972,141 B1 | 12/2005 | Bries et al. |
| 7,078,093 B2 * | 7/2006 | Sheridan et al. .............. 428/343 |
| 2002/0009568 A1 | 1/2002 | Bries |
| 2002/0132925 A1 | 9/2002 | Cernohous et al. |
| 2002/0168516 A1 | 11/2002 | Luhmann et al. |
| 2004/0109096 A1 | 6/2004 | Anderson et al. |
| 2004/0187412 A1 | 9/2004 | McCain |
| 2004/0244315 A1 | 12/2004 | Rust |
| 2006/0127626 A1 | 6/2006 | Fleming et al. |
| 2007/0077418 A1 | 4/2007 | Sakurai et al. |

OTHER PUBLICATIONS

Dow Corning Corporation, "Material Safety Data Sheet; SYL-OFF® Q2-7785 Release Coating," Dec. 11, 2006, Version 1.2, (9 pages).

Dow Corning Corporation, "Product Selection and Application Guide; *Dow Corning*® brand High-Performance Silicone PSAs," 2006, (12 pages).

Dow Corning Corporation, "Product Information Release Coatings; *SYL-OFF*® Q2-7785 Release Coating, *SYL-OFF*® Q2-7560 Crosslinker," 2001, (7 pages).

Down Corning Corporation, "Facts on File: Property Modification of Silicone Pressure Sensitive Adhesives," 2005 (2 pages).

* cited by examiner

MULTI-LAYER ASSEMBLY, MULTI-LAYER STRETCH RELEASING PRESSURE-SENSITIVE ADHESIVE ASSEMBLY, AND METHODS OF MAKING AND USING THE SAME

CROSS REFERENCE TO RELATED APPLICATIONS

This application is a continuation of U.S. application Ser. No. 11/747,443, filed May 11, 2007, now issued as U.S. Pat. No. 8,334,037, the disclosure of which is incorporated by reference in their entirety herein.

BACKGROUND

The invention relates to releasing a silicone-based pressure-sensitive adhesive composition from contact with a release liner after aging.

Silicone-based pressure-sensitive adhesive compositions are very versatile because they tend to exhibit good adhesion to a variety of substrates including glass, ceramic, vinyl siding, finished wood, and painted drywall under challenging environmental conditions including temperature and humidity extremes. Many silicone-based pressure-sensitive adhesive compositions are coated onto a release liner as a wet composition, dried and wound up into a roll. Providing the silicone-based pressure-sensitive adhesive on a release liner facilitates further processing of the adhesive including, e.g., transfer laminating, converting and packaging.

Release liners provide a variety of functions for pressure-sensitive adhesive compositions including, e.g., preventing contamination of the adhesive layer, facilitating handling of the adhesive or an adhesive-coated article (e.g., by providing support thereto as well as covering the adhesive), identifying articles on which the release liner is disposed and combinations thereof. A release liner is often left in place on a pressure-sensitive adhesive composition until the adhesive layer is converted, packaged, or shipped to ultimate users, and in many instances the release liner is left in place until the adhesive is adhered to another substrate. As a result, a pressure-sensitive adhesive coated release liner potentially may experience a variety of environmental conditions including changes in temperature and humidity and must be functional over extended periods of time.

The strength of the adhesive bond formed between a silicone-based pressure-sensitive adhesive composition and a release liner tends to increase over time and upon exposure to elevated temperatures. This phenomenon is referred to as "adhesion build." If the strength of the bond between the adhesive composition and the release liner is too great, the release liner and the adhesive composition cannot be separated from each other or can be separated only with difficulty, rendering the adhesive unsuitable for its intended purpose or frustrating the user. For articles that include silicone-based pressure-sensitive adhesive compositions, an undesirable degree of adhesion build often occurs before the end of the useful life of the article thereby effectively decreasing the useful life of the article.

A number of attempts have been made to decrease the degree of adhesion build between an adhesive and a liner. One useful method involves altering the surface chemistry of the liner by coating the liner with a surface chemistry modifier. Fluorosilicones are a common class of surface chemistry modifiers that have been coated on liners to improve their release properties. Although some of these methods have reduced the adhesion level, adhesion build continues to occur and the rate of adhesion build remains undesirable. It would be desirable to achieve a silicone-based pressure-sensitive adhesive article that includes a silicone-based pressure-sensitive adhesive composition in contact with a release liner and that can be stored for an extended period of time and exhibit a sufficiently low adhesion build such that the adhesive composition releases cleanly and relatively easily from the release liner. It also would be desirable to achieve a stretch releasing pressure-sensitive adhesive article that can be stored for an extended period of time and exhibit a sufficiently low adhesion build to the release liner such that the adhesive composition releases cleanly and relatively easily from the release liner.

Pressure-sensitive adhesive articles that are removable from a substrate through stretching are often referred to as stretch releasing pressure-sensitive adhesive articles. A number of backed and un-backed stretch releasing pressure-sensitive adhesive articles are described in literature and in patents. U.S. Pat. No. 4,024,312 (Korpman), for example, discloses a highly conformable adhesive article that includes a highly extensible and elastic backing film laminated with an adhesive layer. The adhesive article is easily stretchable and may be removed from a surface by stretching the article lengthwise in a direction substantially parallel to the surface. German Patent No. 33 31 016 discloses a high elasticity, low plasticity adhesive film based on a thermoplastic rubber and tackifying resins in which the adhesive bond can be broken by stretching the adhesive film in the direction of the plane of the adhesive bond. U.S. Pat. No. 5,516,581 (Kreckel et al.) discloses a removable adhesive article having a highly extensible and substantially inelastic backing coated with a layer of pressure-sensitive adhesive and a non-adhesive pull tab to facilitate stretch removal. The adhesive article can be removed from most surfaces without damaging the substrate by grasping the non-adhesive pull tab and stretching the article in a direction substantially parallel to the surface of the substrate. U.S. Pat. No. 6,231,962 (Bries et al.) discloses a removable foam adhesive strip that includes a backing that includes a layer of polymeric foam and a pressure-sensitive adhesive layer coated on at least one surface of the backing. A commercially available stretch releasing adhesive article is sold under the trade designation COMMAND by 3M Company, St. Paul, Minn.

SUMMARY

The invention features a multi-layer assembly that includes a multi-layer pressure-sensitive adhesive article, which includes a silicone-based pressure-sensitive adhesive composition, disposed on a release liner, and exhibits an adhesion build to the release liner that is sufficiently small such that the release liner can be easily removed from the adhesive composition even after the multi-layer assembly has been stored for an extended period of time at ambient, or even elevated, temperatures.

In one aspect, the multi-layer assembly includes a release liner, a first layer that includes a pressure-sensitive adhesive composition disposed on the release liner, the pressure-sensitive adhesive composition includes a silicone polymer selected from the group consisting of silicone polyurea block copolymers, polydiorganosiloxane polymers, and combinations thereof, and a second layer that includes a composition that includes an elastomer disposed on the first layer, the composition of the second layer being different from the pressure-sensitive adhesive composition of the first layer, the first layer of the multi-layer assembly exhibiting a release force to the release liner of no greater than 100 gram per 0.5 inch width after the multi-layer assembly has been stored for 46 days at 120° F. In one embodiment, the first layer of the multi-layer assembly exhibits a release force to the release liner of no greater than 50 g per 0.5 inch width after the multi-layer assembly has been stored for 46 days at 120° F. In another embodiment, the first layer of the multi-layer assembly exhibits a release force to the release liner of no greater than 200 g per 0.5 inch width after the multi-layer assembly has been stored for 88 days at 120° F. In other embodiments, the first layer of the multi-layer assembly exhibits a release force to the release liner of no greater than 100 g per 0.5 inch width after the multi-layer assembly has been stored for 88 days at 120° F.

In some embodiments, the multi-layer assembly is in the form of a roll. In one embodiment, the multi-layer assembly is in the form of a roll, the first layer is in contact with a first major surface of the release liner, and the second layer is in contact with a second major surface of the release liner.

In another embodiment, when the release liner is removed and the assembly is bonded to a painted drywall surface through the first layer, the assembly exhibits a static shear to the painted drywall of at least 30,000 minutes. In other embodiments, when the release liner is removed and the assembly is bonded to a glass substrate through the first layer, the assembly exhibits a static shear to the glass substrate of at least 30,000 minutes.

In one embodiment, the first layer exhibits a first release force to the first major surface of the release liner and the second layer exhibits a second release force to the second major surface of the release liner, the ratio of the first release force to the second release force being at least 1.5:1. In another embodiment, the ratio of the first release force to the second release force is at least 2:1. In other embodiments, the ratio of the first release force to the second release force is at least 10:1.

In other embodiments, the release liner includes a layer of film and a coating that includes silicone, the first layer of the multi-layer assembly being in contact with the coating of the release liner.

In some embodiments, the pressure-sensitive adhesive composition of the first layer includes a silicone polyurea block copolymer that includes the reaction product of i) a polydiorganosiloxane diamine having a molecular weight of at least 5,000 g/mole, and ii) a polyisocyanate, and from about 30% by weight to about 70% by weight MQ resin. In some embodiments, the silicone polyurea block copolymer includes the reaction product of a polydiorganosiloxane diamine having a molecular weight of at least 5,000 g/mole, a polyamine, and a polyisocyanate.

In one embodiment, the elastomer of the second layer includes a silicone polymer different from the silicone polymer of the pressure-sensitive adhesive composition of the first layer, acrylic resin, natural rubber, polychloroprene, nitrile rubber, butyl rubber, polysulfide rubber, polyisoprene, ethylene-propylene diene rubber, polyurethane, acrylonitrile-butadiene rubber, acrylonitrile-butadiene-styrene, styrene-butadiene, styrene-butadiene-styrene, styrene-isoprene-styrene, styrene-ethylene-propylene-styrene, styrene-ethylene-butylene-styrene or a combination thereof.

In another embodiment, the composition of the second layer is a pressure-sensitive adhesive composition. In other embodiments, the pressure-sensitive adhesive composition of the second layer includes a silicone polyurea block copolymer. In some embodiments, the pressure-sensitive adhesive composition of the second layer further includes a tackifying agent.

In another embodiment, the composition of the second layer includes a pressure-sensitive adhesive composition that includes the reaction product of isooctylacrylate and acrylic acid.

In some embodiments, the multi-layer assembly includes a backing, the second layer being disposed on the backing. In one embodiment, the backing includes foam. In other embodiments, the backing includes a composite that includes a layer of foam that includes a first major surface and a second major surface, a first layer of film bonded to the first major surface of the layer of foam, and a second layer of film bonded to the second major surface of the layer of foam. In another embodiment, the multi-layer assembly further includes a nontacky tab.

In one embodiment, a stretch releasing pressure-sensitive adhesive assembly includes a multi-layer assembly described herein, the assembly after removal of the release liner and after adhesion to a surface through the pressure-sensitive adhesive composition of the first layer, being cleanly removable from the surface through stretching without damaging the surface.

In one embodiment, a multi-layer assembly described herein is in the form of a stretch releasing pressure-sensitive adhesive assembly that includes a backing that includes a first major surface and a second major surface opposite the first major surface, and a multi-layer assembly described herein, the second layer of the multi-layer assembly being bonded to the first major surface of the backing, the stretch releasing pressure-sensitive adhesive assembly, after removal of the release liner and after adhesion to a surface through the pressure-sensitive adhesive composition of the first layer, being cleanly removable from the surface through stretching without damaging the surface. In one embodiment, the composition of the second layer further includes a tackifying agent. In some embodiments, the composition of the second layer includes a pressure-sensitive adhesive composition.

In other embodiments, the stretch releasing pressure-sensitive adhesive assembly further includes a second multi-layer assembly bonded to the second major surface of the backing, the second multi-layer assembly that includes a release liner, a first layer that includes a pressure-sensitive adhesive composition disposed on the release liner of the second multi-layer assembly, and a second layer that includes a composition that includes an elastomer disposed on the first layer of the second multi-layer assembly.

In another embodiment, the pressure-sensitive adhesive composition of the first layer of the second multi-layer assembly includes a silicone polymer selected from the group consisting of silicone polyurea block copolymers, polydiorganosiloxane, polyamide, polysiloxane grafted copolymers, and combinations thereof.

In other embodiments, the first layer of the second multi-layer assembly exhibits a release force to the release liner of the second multi-layer assembly of no greater than 100 g per 0.5 inch width after the second multi-layer assembly has been stored for 46 days at 120° F.

In another embodiment, the backing includes foam and has a first major surface and a second major surface, the second layer of the first multi-layer assembly being disposed on the first major surface of the foam backing and the second layer of the second multi-layer assembly being disposed on the second major surface of the foam backing.

In other embodiments, the multi-layer assembly further includes a reaction product of a fluorosilicone polymer and an organohydrogenpolysiloxane crosslinking agent disposed on a first major surface of the release liner, the first layer being in contact with the reaction product on the first major surface. In one embodiment, the multi-layer assembly further includes a reaction product of a fluorosilicone polymer and an organohydrogenpolysiloxane crosslinking agent disposed on a second major surface of the release liner, the reaction product on the second major surface being different from the reaction product on the first major surface. In another embodiment, the fluorosilicone polymer includes at least about 35% fluorine substitution. In some embodiments, the fluorosilicone polymer includes at least about 42% fluorine substitution.

In one embodiment, the multi-layer assembly includes a release liner, a reaction product of a fluorosilicone polymer that includes at least about 35% fluorine substitution and an organohydrogenpolysiloxane crosslinking agent disposed on a first major surface of the release liner, a first layer that includes a pressure-sensitive adhesive composition disposed on the first major surface of the release liner and in contact with the reaction product, the pressure-sensitive adhesive composition includes silicone polyurea block copolymers, polydiorganosiloxane polymers, or a combination thereof, and a second layer that includes a composition that includes an elastomer disposed on the first layer, the composition of the second layer being different from the pressure-sensitive adhesive composition of the first layer.

In another aspect, the invention features a method of making a pressure-sensitive adhesive assembly, where the method includes coating a pressure-sensitive adhesive composition that includes a silicone polymer on a first major surface of a first release liner to form a first layer, coating a composition on the first layer to form a second layer, the composition of the second layer that includes an elastomer, at least one of the pressure-sensitive adhesive composition of the first layer and the composition of the second layer being in an uncured state during the coating of the second layer, and curing at least one of the first layer and the second layer, the first pressure-sensitive adhesive composition of the multi-layer assembly exhibiting a release force to the release liner of no greater than 100 gram per 0.5 inch width after the multi-layer assembly has been stored for 46 days at 120° F. In one embodiment, the first and second layers are coated on each other substantially simultaneously. In another embodiment, the method further includes rolling the multi-layer assembly upon itself in the form of a roll. In other embodiments, the curing includes at least one of cooling, drying, crosslinking or a combination thereof.

In some embodiments, coating the second layer includes extruding, dry laminating or a combination thereof.

In other embodiments, the composition of the second layer includes a pressure-sensitive adhesive composition.

In some embodiments, the pressure-sensitive adhesive composition of the first layer is uncured during the coating of the second layer on the first layer and the composition of the second layer includes a pressure-sensitive adhesive composition. In another embodiment, the second layer is uncured during the coating of the second layer on the first layer. In other embodiments, the first layer and the second layer are uncured during the coating of the second layer on the first layer.

In one embodiment, the method further includes priming at least one of the first layer and the second layer prior to contacting the first layer with the second layer.

In other aspects, the invention features a method of using an assembly described herein, the method including removing the release liner to expose the pressure-sensitive adhesive composition of the first layer, and contacting the exposed pressure-sensitive adhesive composition of the first layer with an object.

The invention features a multi-layer pressure-sensitive adhesive assembly that includes a layer of silicone polymer containing pressure-sensitive adhesive composition and that exhibits relatively low adhesion build to a release liner over time such that the release liner can be relatively easily removed from the silicone-based pressure-sensitive adhesive composition during the useful life of the assembly.

The invention also features a multi-layer stretch releasing pressure-sensitive adhesive assembly that exhibits good adhesion to at least one of a variety of surfaces including, e.g., painted drywall, glass, ceramic, porcelain, marble, granite, varnished wood, stained wood, fiberglass composites, plastic or a combination thereof.

Other features and advantages will be apparent from the following description of the drawings and the preferred embodiments and from the claims.

DETAILED DESCRIPTION

The present inventors have discovered that through the use of multiple layers, a silicone-based pressure-sensitive adhesive composition disposed on a release liner can exhibit an adhesion build to the release liner that is sufficiently small such that the release liner can be easily removed from the silicone-based pressure-sensitive adhesive composition even after the multi-layer assembly has been stored for an extended period of time at ambient, or even elevated, temperatures. In some embodiments the multi-layer silicone-based pressure-sensitive adhesive assembly can be wound up on itself in the form of a roll and the exterior most layer cleanly releases from the release liner upon unwind even after storage for an extended period of time at ambient, or even elevated, temperatures.

The multi-layer assembly preferably is free of interlayer failure between the layer of the silicone-based pressure-sensitive adhesive composition and the second layer. One measure of the presence of interlayer failure is static shear. The multi-layer assembly preferably exhibits a static shear of at least 10,000 minutes, of at least 30,000 minutes or even of at least 45,000 minutes at room temperature (i.e., from about 23° C. to about 27° C.) and 50% relative humidity on painted drywall or even on a glass substrate. Some constructions of the multi-layer assembly also exhibit a static shear of at least 10,000 minutes, of at least 30,000 minutes or even of at least 45,000 minutes on a glass substrate at 90% relative humidity and 90° F.

Figure 1:
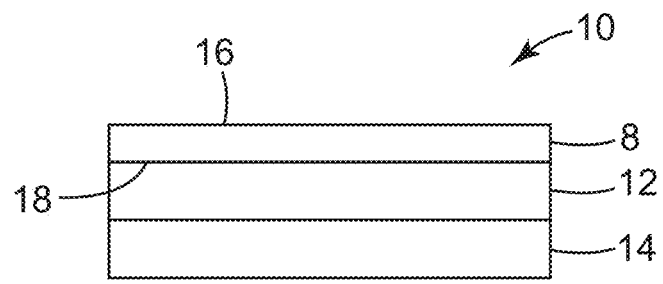
FIG. 1 is a side view of a multi-layer pressure-sensitive adhesive assembly.

The multi-layer assembly 10 includes a release liner 8 and a multi-layer pressure-sensitive adhesive article that includes a first layer 12 that includes a silicone-based pressure-sensitive adhesive composition disposed on a first major surface 18 of the release liner 8 and a second layer 14 that includes an elastomer-based composition (e.g., an elastomer-based pressure-sensitive adhesive composition, tacky elastomer and non-tacky elastomer) disposed on the first layer 12 of the multi-layer pressure-sensitive adhesive article, as illustrated in FIG. 1. Preferably the release liner 8 is easily and cleanly removable from the layer 12 of the silicone-based pressure-sensitive adhesive composition after the multi-layer assembly has been stored for at least one week, at least three weeks, or even at least a month at 120° F. (48.9° C.). More preferably the first layer 12 exhibits a release force to the release liner 8 that is no greater than 200 gram per 0.5 inch width, no greater than 100 gram per 0.5 inch width, no greater than 50 gram per 0.5 inch width, or even no greater than 5 gram per 0.5 inch width, after the multi-layer assembly has been stored for 46 days at 120° F., for 88 days at 120° F. or even for 365 days at 120° F.

Figure 2:
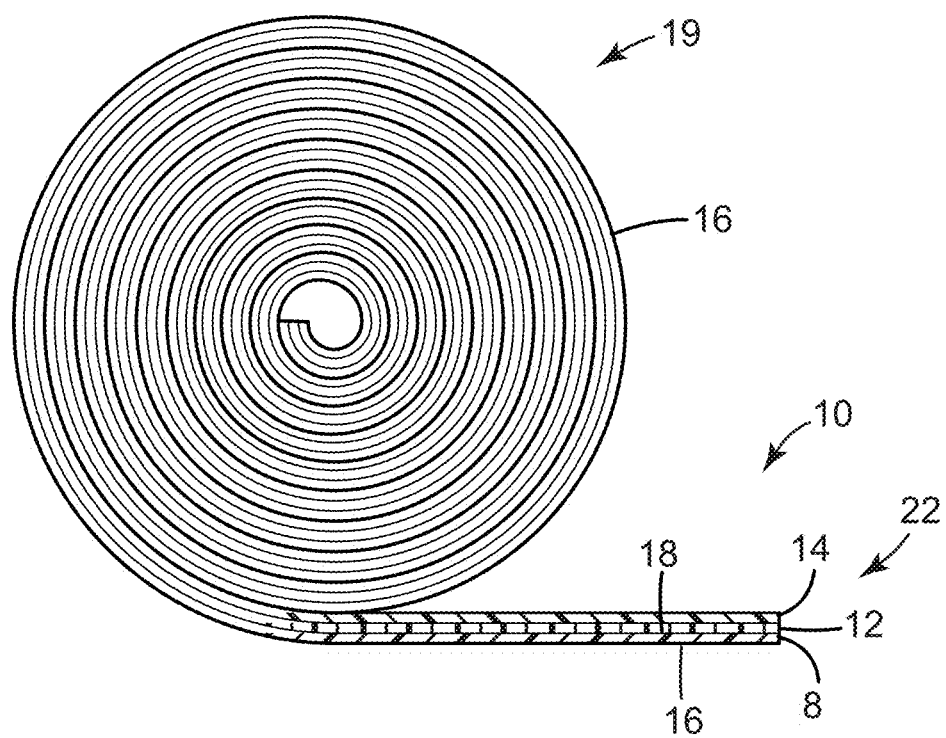
FIG. 2 is a side view of the multi-layer pressure-sensitive adhesive assembly of FIG. 1 wound up on itself in the form of a roll.

FIG. 2 illustrates an embodiment of the multi-layer assembly 10 of FIG. 1 wound upon itself in the form of a roll 19 such that the silicone-based pressure-sensitive adhesive composition of the first layer 12 is in contact with the first major surface 18 of the release liner 8 and the second layer 14 is in contact with a second major surface 16 of the release liner 8. The exterior layers 8, 14 of the roll 19 of the multi-layer assembly 10 contact each other. The silicone-based pressure-sensitive adhesive composition of the first layer 12 and the composition of the second layer 14 exhibit different release properties to the major surfaces 16, 18 of the release liner 8 with which they are in contact. The force required to remove the release liner 8 from the layer of silicone-based pressure-sensitive adhesive composition 12 is referred to as the "release force." When an unwind force is applied to the leading edge 22 of the roll 19, the layer 12 silicone-based pressure-sensitive adhesive composition exhibits a greater release force to the first major surface 18 of the release liner 8 relative to the release force exhibited by the composition of the second layer 14 to the second major surface 16 of the release liner 8 to enable the silicone-based pressure-sensitive adhesive composition of the first layer 12 to remain bonded to the first major surface 18 of the release liner 8 and the second layer 14 to cleanly release from second major surface 16 of the release liner 8. This property is referred to as "differential release." The layers 12, 14 of the multi-layer pressure-sensitive adhesive article and the release liner 8 are selected to enable the layers 12, 14 to exhibit differential release to the release liner 8 so that when the leading edge 22 of the multi-layer assembly 10 is unwound from the roll 19, the second layer 14 cleanly and relatively easily peels away from the second major surface 16 of the release liner 8 and the first layer 12 remains tightly adhered to the first major surface 18 of the release liner 8. Preferably the ratio of the release force exhibited by the pressure-sensitive adhesive composition of the first layer 12 to the first major surface 18 of the release liner 8 to the release force exhibited by the composition of the second layer 14 to the second major surface 16 of the release liner 8 is at least 1.1:1, at least 1.5:1, at least 2:1, at least 5:1 or even at least 10:1.

The release liner of the multi-layer assembly can be of a variety of forms including, e.g., sheet, web, tape, and film. The release liner exhibits properties that enable the silicone-based pressure-sensitive adhesive composition to be cleanly released from the surface of the release liner after the multi-layer pressure-sensitive adhesive assembly has been stored for at least 30 days at 120° F. Preferably the nature of the release liner is such that the silicone-based pressure-sensitive adhesive composition exhibits a release force to the release liner of no greater than 200 gram per 0.5 inch width, no greater than 100 gram per 0.5 inch width, no greater than 50 gram per 0.5 inch width, or even no greater than 5 gram per 0.5 inch width, after the multi-layer assembly has been stored for 46 days at 120° F., for 88 days at 120° F. or even for 365 days at 120° F.

At least one surface of the release liner can be treated to alter (e.g., increase or decrease) the force required to remove the release liner from the silicone-based pressure-sensitive adhesive composition. Useful methods of treating the release liner include applying a release agent to the surface of the release liner, creating a patterned texture on the surface of the release material to decrease the contact area between an adhesive composition and the release material, and combinations thereof.

In applications in which the multi-layer assembly is wound up on itself in the form of a roll such that two different layers of the multi-layer assembly are in contact with the two opposing major surfaces of the release liner, the release liner can provide differential release, i.e., the release force exhibited by the adhesive at the first major surface of the release liner differs from the release force exhibited by the adhesive at the second, opposing major surface of the release liner. The release liner can include a first release coating on a first major surface thereof and optionally a second release coating on the second major surface opposite the first major surface of the release liner to assist in achieving differential release. The properties of the release coatings (e.g., composition and thickness) can be selected based on a variety of factors including, e.g., the chemistry of the composition with which the surface of the release liner will be in contact, the desired release properties (e.g., which adhesive composition is to remain bonded to the release liner upon unwind and which adhesive composition is to release from the release liner upon unwind), and combinations thereof. The first and second release coatings can be the same or different and coated at the same or different coating weight. One useful release coating includes a first surface that includes a fluorosilicone release agent and a second surface that includes a fluorosilicone release agent, a silicone release agent, and combinations thereof.

A variety of release agents are suitable for use on the release liner. Examples of useful classes of release agents include silicone, silicone copolymers including, e.g., silicone acrylates, silicone polyurethanes and silicone polyureas, fluorochemicals, fluorocarbons, fluorosilicones, perfluoropolyethers, urethanes, acrylates, polyolefins (e.g., polyethylene, polypropylene, and low density polyethylene), and other low surface energy-based release compositions, and combinations thereof.

Useful fluorosilicone release coatings include the reaction product of a fluorosilicone polymer, an organohydrogenpolysiloxane crosslinking agent and a platinum-containing catalyst as described, e.g., in U.S. Pat. No. 5,082,706 (Tangney) and incorporated herein.

Other useful fluorine containing organosilicone release coating compositions include, e.g., release coating compositions derived from organopolysiloxanes having fluorine containing organic groups and alkenyl groups, an organohydrogensiloxane crosslinking agent and a platinum-containing catalyst, and release coating compositions derived from organopolysiloxanes having fluorine containing organic groups and silicon-bonded hydrogen groups, an alkenyl functional organopolysiloxane and a platinum-containing catalyst, examples of which are described in U.S. Pat. No. 5,578,381 (Hamada et al.) and incorporated herein. Examples of other suitable fluorosilicone release chemistries are described in U.S. Pat. Nos. 4,842,902, 4,889,753, 4,880,440, 4,980,443 and 5,082,706 and incorporated herein.

One class of fluorosilicone polymers useful in forming release coating compositions includes fluorosilicone polymers that exhibit a degree of polymerization of greater than 100, greater than 500 or even greater than 900, a silicone to carbon ratio of at least about 1:1, at least about 2:1, at least about 5:1 or even at least about 10:1, a % of repeat units that have fluorine substitution in the backbone of the polymer (herein after referred to as "% fluorine substitution") of at least about 30% (i.e., 30 out of 100 repeat units in the backbone of the polymer include fluorine), at least about 35%, at least about 40%, at least about 45%, or even at least about 50% fluorine substitution, and combinations thereof. One useful fluorosilicone polymer includes from about 37% to about 41% fluorine substitution. Another useful fluorosilicone polymer includes from about 42% to about 47% fluorine substitution.

A number of useful commercially available fluorosilicone polymers are available from Dow Corning Corp. (Midland, Mich.) under the SYL-OFF and the SYL-OFF ADVANTAGE series of trade designations including, e.g., SYL-OFF Q2-7786 and SYL-OFF Q2-7785. These fluorosilicone polymers are particularly useful in forming release coating compositions when combined with a suitable crosslinking agent. One useful crosslinking agent is available under the SYL-OFF Q2-7560 trade designation from Dow Corning Corp. Other useful crosslinking agents are disclosed in U.S. Pat. No. 5,082,706 (Tangney) and U.S. Pat. No. 5,578,381 (Hamada et al.) and incorporated herein.

Other fluorosilicone polymers are commercially available from General Electric Co. (Albany, N.Y.), Wacker Chemie (Germany), Th. Goldschmidt AC (Germany), Akrosil (Menasha, Wis.), and Loparex (Willowbrook, Ill.).

Other suitable release coating compositions include solventless platinum silicone.

Useful silicone release chemistries are described in, e.g., U.S. Pat. No. 2,588,367 (Dennett), U.S. Pat. No. 3,960,810 (Chandra et al.), U.S. Pat. No. 4,162,356 (Grenoble), U.S. Pat. No. 4,306,050 (Koerner et al.), and U.S. Pat. No. 6,204,350 (Liu et al.), British Patent No. 1,375,792, (Colquhoun et al.) and German Patent No. 2,736,499 (Hockemeyer) and incorporated herein. Examples of epoxy silicone release agents are disclosed in U.S. Pat. No. 4,822,687 (Kessel et al.), U.S. Pat. No. 5,217,805 (Kessel et al.), U.S. Pat. No. 5,576,356 (Kessel et al.), and U.S. Pat. No. 5,332,797 (Kessel et al.) and incorporated herein. Examples of useful perfluoropolyethers are disclosed in U.S. Pat. No. 4,830,910 (Larson) and incorporated herein. Examples of useful fluorocarbons disposed in a polymer matrix are disclosed in U.S. Pat. No. 5,110,667 (Galick et al.) and incorporated herein. Suitable release agents, release liners and methods for treating release liners are described in, e.g., U.S. Pat. Nos. 4,472,480, 4,980,443 and 4,736,048 and incorporated herein. Examples of other silicone release coating compositions are disclosed in U.S. Pat. No. 6,806,339 (Cray et al.) U.S. Pat. No. 6,545,076 (Kaiya et al.) and U.S. Pat. No. 6,008,310 (Itoh et al.) and incorporated herein Examples of suitable materials for use as a release liners include, e.g., paper (e.g., kraft paper), polymer films (e.g., polyethylene, polypropylene and polyester), composite liners, and combinations thereof. One example of a useful release liner is a fluoroalkyl silicone polycoated paper. In some constructions, the release liner includes a kraft paper sandwiched between two polymer films that have been treated to exhibit release properties. Release liners can optionally include a variety of markings and indicia including, e.g., lines, art work, brand indicia, and other information.

The Silicone-Based Pressure-Sensitive Adhesive Composition Layer.

The silicone-based pressure-sensitive adhesive composition includes a silicone polymer and optionally other components including, e.g., tackifying agents, plasticizers and combinations thereof. Examples of suitable silicone polymers include silicones, silicone polyurea block copolymers, polydiorganosiloxane polymers, silicone polyamides (examples of which are disclosed in U.S. patent application Ser. No. 11/317,602 and incorporated herein), polysiloxane grafted copolymers (examples of which are disclosed, e.g., in U.S. Pat. No. 4,693,935 (Mazurek) and incorporated herein), and mixtures thereof.

One suitable silicone-based pressure-sensitive adhesive composition includes a MQ tackifying resin and a silicone polymer. The MQ tackifying resin and the silicone polymer can be present in the form of, e.g., a blend of MQ tackifying resin and silicone polymer, a reaction product of MQ tackifying resin and silicone polymer, e.g., a condensation cure or addition cure type reaction product, or a mixture thereof. Preferably the silicone polymer is present in the silicone-based pressure-sensitive adhesive composition in an amount of from about 30% by weight to about 70% by weight or even from about 35% by weight to about 65% by weight. The MQ tackifying resin preferably is present in the silicone-based pressure-sensitive adhesive composition in an amount of from about 30% by weight to about 70% by weight, from about 40% by weight to about 60% by weight, or even from about 45% by weight to about 55% by weight.

Useful MQ tackifying resins include, e.g., MQ silicone resins, MQD silicone resins, and MQT silicone resins, which also may be referred to as copolymeric silicone resins and which preferably have a number average molecular weight of from about 100 to about 50,000 or even from about 500 to about 20,000 and generally have methyl substituents. The MQ silicone resins include both non-functional and functional resins, the functional resins having one or more functionalities including, for example, silicon-bonded hydrogen, silicon-bonded alkenyl and silanol.

MQ silicone resins are copolymeric silicone resins having $R'_3SiO_{1/2}$ units (M units) and $SiO_{4/2}$ units (Q units). Such resins are described in, for example, Encyclopedia of Polymer Science and Engineering, vol. 15, John Wiley & Sons, New York, (1989), pp. 265 to 270, and U.S. Pat. Nos. 2,676,182; 3,627,851; 3,772,247; and 5,248,739, and incorporated herein. MQ silicone resins having functional groups are described in U.S. Pat. No. 4,774,310, which describes silyl hydride groups, U.S. Pat. No. 5,262,558, which describes vinyl and trifluoropropyl groups, and U.S. Pat. No. 4,707,531, which describes silyl hydride and vinyl groups, and incorporated herein. The above-described resins are generally prepared in solvent. Dried or solventless MQ silicone resins are prepared as described in U.S. Pat. Nos. 5,319,040, 5,302,685 and 4,935,484, and incorporated herein.

MQD silicone resins are terpolymers having $R'_3SiO_{1/2}$ units (M units), $SiO_{4/2}$ units (Q units), and $R'_2SiO_{2/2}$ units (D units) as described, e.g., in U.S. Pat. No. 5,110,890 and Japanese Kokai HEI 2-36234, and incorporated herein.

MQT silicone resins are terpolymers having $R_3SiO_{1/2}$ units (M units), $SiO_{4/2}$ units (Q units), and $RSiO_{3/2}$ units (T units).

Commercially available MQ resins include SR-545 MQ resin in toluene available from General Electric Co., Silicone Resins Division (Waterford, N.Y.), MQOH resins which are MQ silicone resins in toluene available from PCR, Inc. (Gainesville, Fla.). Such resins are generally supplied in organic solvent. These organic solutions of MQ silicone resin may be used as is or may be dried by any number of techniques known in the art including, e.g., spray drying, oven drying, and steam separation, to provide a MQ silicone resin at 100 percent non-volatile content. The MQ silicone resin can also include blends of two or more silicone resins.

One example of a useful class of silicone polymers is silicone polyurea block copolymers. Silicone polyurea block copolymers include the reaction product of a polydiorganosiloxane diamine (also referred to as silicone diamine), a diisocyanate, and optionally an organic polyamine. Suitable silicone polyurea block copolymers are represented by the repeating unit:

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, polyalkylene oxide, including for example, polyethylene oxide, polypropylene oxide, polytetramethylene oxide, and copolymers and mixtures thereof;

m is a number that is 0 to about 1000;

n is a number that is at least 1; and p is a number that is at least 10, preferably about 15 to about 2000, more preferably 30 to 1500.

Useful silicone polyurea block copolymers are disclosed in, e.g., U.S. Pat. Nos. 5,512,650, 5,214,119, and 5,461,134, and International Publication numbers WO 96/35458, WO 98/17726, WO 96/34028, WO 96/34030 and WO 97/40103, and incorporated herein.

Examples of useful silicone diamines for use in the preparation of silicone polyurea block copolymers include polydiorganosiloxane diamines represented by the formula

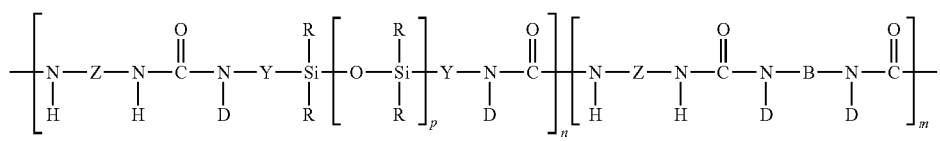

wherein
each R is a moiety that, independently, is an alkyl moiety, preferably having about 1 to 12 carbon atoms, and may be substituted with, for example, trifluoroalkyl or vinyl groups, a vinyl radical or higher alkenyl radical preferably represented by the formula $R^2(CH_2)_aCH=CH_2$ wherein $R^2$ is $-(CH_2)_b-$ or $-(CH_2)_cCH=CH-$ and a is 1, 2 or 3; b is 0, 3 or 6; and c is 3, 4 or 5, a cycloalkyl moiety having from about 6 to 12 carbon atoms and may be substituted with alkyl, fluoroalkyl, and vinyl groups, or an aryl moiety preferably having from about 6 to 20 carbon atoms and may be substituted with, for example, alkyl, cycloalkyl, fluoroalkyl arid vinyl groups or R is a perfluoroalkyl group as described in U.S. Pat. No. 5,028,679, and incorporated herein, or a fluorine-containing group, as described in U.S. Pat. No. 5,236,997 and incorporated herein, or a perfluoroether-containing group, as described in U.S. Pat. Nos. 4,900,474 and 5,118,775 and incorporated herein. Preferably at least 50% of the R moieties are methyl radicals with the balance being monovalent alkyl or substituted alkyl radicals having from 1 to 12 carbon atoms, alkenylene radicals, phenyl radicals, or substituted phenyl radicals;

each Z is a polyvalent radical that is an arylene radical or an aralkylene radical preferably having from about 6 to 20 carbon atoms, an alkylene or cycloalkylene radical preferably having from about 6 to 20 carbon atoms, preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical preferably having 6 to 20 carbon atoms;

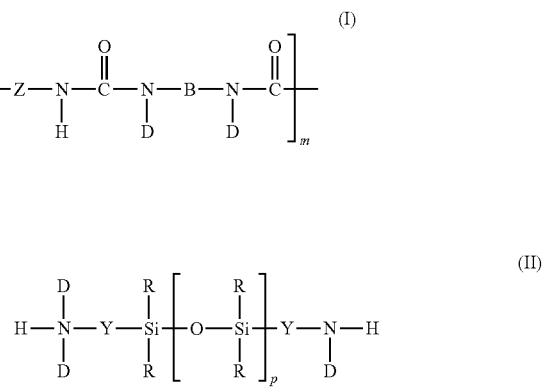

wherein each of R, Y, D, and p are defined as above. Preferably the number average molecular weight of the polydiorganosiloxane diamines is greater than about 700.

Useful polydiorganosiloxane diamines include any polydiorganosiloxane diamines that fall within Formula II above and those polydiorganosiloxane diamines having molecular weights in the range of from about 700 g/mole to 150,000 g/mole, from about 10,000 g/mole to about 60,000 g/mole, or even from about 25,000 g/mole to about 50,000 g/mole. Suitable polydiorganosiloxane diamines and methods of manufacturing polydiorganosiloxane diamines are disclosed in, e.g., U.S. Pat. Nos. 3,890,269, 4,661,577, 5,026,890, and 5,276,122, and International Patent Publication Nos. WO 95/03354 and WO 96/35458, and incorporated herein.

Examples of useful polydiorganosiloxane diamines include polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures and copolymers thereof.

Suitable polydiorganosiloxane diamines are commercially available from, for example, Shin Etsu Silicones of America, Inc., Torrance, Calif., and Huls America, Inc. Preferably the polydiorganosiloxane diamines are substantially pure and prepared as disclosed in U.S. Pat. No. 5,214,119 and incorporated herein. Polydiorganosiloxane diamines having such high purity are prepared from the reaction of cyclic organosilanes and bis(aminoalkyl)disiloxanes utilizing an anhydrous amino alkyl functional silanolate catalyst such as tetramethylammonium-3-aminopropyldimethyl silanolate, preferably in an amount less than 0.15% by weight based on the weight of the total amount of cyclic organosiloxane with the reaction run in two stages. Particularly preferred polydiorganosiloxane diamines are prepared using cesium and rubidium catalysts and are disclosed in U.S. Pat. No. 5,512,650 and incorporated herein.

The polydiorganosiloxane diamine component provides a means of adjusting the modulus of the resultant silicone polyurea block copolymer. In general, high molecular weight polydiorganosiloxane diamines provide copolymers of lower modulus whereas low molecular polydiorganosiloxane polyamines provide copolymers of higher modulus.

Examples of useful polyamines include polyoxyalkylene diamines including, e.g., polyoxyalkylene diamines commercially available under the trade designation D-230, D-400, D-2000, D-4000, ED-2001 and EDR-148 from Hunstman Corporation (Houston, Tex.), polyoxyalkylene triamines including, e.g., polyoxyalkylene triamines commercially available under the trade designations T-403, T-3000 and T-5000 from Hunstman, and polyalkylenes including, e.g., ethylene diamine and polyalkylenes available under the trade designations DYTEK A and DYTEK EP from DuPont (Wilmington, Del.).

The optional polyamine provides a means of modifying the modulus of the copolymer. The concentration, type and molecular weight of the organic polyamine influence the modulus of the silicone polyurea block copolymer.

The silicone polyurea block copolymer preferably includes polyamine in an amount of no greater than about 3 moles, from about 0.25 mole to about 2 moles. Preferably the polyamine has a molecular weight of no greater than about 300 g/mole.

Any polyisocyanate including, e.g., diisocyanates and triisocyanates, capable of reacting with the above-described polyamines can be used in the preparation of the silicone polyurea block copolymer. Examples of suitable diisocyanates include aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5,5'-tetraethyl)diphenylmethane, 4,4-diisocyanato-3,3'-dimethoxybiphenyl(o-dianisidine diisocyanate), 5-chloro-2,4-toluene diisocyanate, and 1-chloromethyl-2,4-diisocyanato benzene, aromatic-aliphatic diisocyanates, such as m-xylene diisocyanate and tetramethyl-m-xylylene diisocyanate, aliphatic diisocyanates such as 1,4-diisocyanatobutane, 1,6-diisocyanatohexane, 1,12-diisocyanatododecane and 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate) and cyclohexylene-1,4-diisocyanate.

Any triisocyanate that can react with a polyamine, and in particular with the polydiorganosiloxane diamine is suitable. Examples of such triisocyanates include, e.g., polyfunctional isocyanates, such as those produced from biurets, isocyanurates, and adducts. Examples of commercially available polyisocyanates include portions of the series of polyisocyanates available under the trade designations DESMODUR and MONDUR from Bayer and PAPI from Dow Plastics.

The polyisocyanate is preferably present in a stoichiometric amount based on the amount of polydiorganosiloxane diamine and optional polyamine.

The silicone polyurea block copolymer can be prepared by solvent-based processes, solventless processes or a combination thereof. Useful solvent-based processes are described in, e.g., Tyagi et al., "Segmented Organosiloxane Copolymers: 2. Thermal and Mechanical Properties of Siloxane-Urea Copolymers," Polymer, vol. 25, December, 1984, and U.S. Pat. No. 5,214,119 (Leir et al.), and incorporated herein. Useful methods of manufacturing silicone polyurea block copolymers are also described in, e.g., U.S. Pat. Nos. 5,512, 650, 5,214,119, and 5,461,134, WO 96/35458, WO 98/17726, WO 96/34028, and WO 97/40103, and incorporated herein.

Silicone polyurea block copolymer-based pressure-sensitive adhesive compositions can also be prepared by solvent-based processes, solventless processes or a combination thereof.

In solvent-based processes, the MQ silicone resin can be introduced before, during or after the polyamines and polyisocyanates have been introduced into the reaction mixture. The reaction of the polyamines and the polyisocyanate is carried out in a solvent or a mixture of solvents. The solvents are preferably nonreactive with the polyamines and polyisocyanates. The starting materials and final products preferably remain completely miscible in the solvents during and after the completion of the polymerization. These reactions can be conducted at room temperature or up to the boiling point of the reaction solvent. The reaction is preferably carried out at ambient temperature up to 50° C.

In substantially solventless processes, the polyamines and the polyisocyanate and the MQ silicone resin are mixed in a reactor and the reactants are allowed to react to form the silicone polyurea block copolymer, which, with the MQ resin, forms the pressure-sensitive adhesive composition.

One useful method that includes a combination of a solvent-based process and a solventless process includes preparing the silicone polyurea block copolymer using a solventless process and then mixing silicone polyurea block copolymer with the MQ resin solution in a solvent. Preferably the silicone polyurea block copolymer-based pressure-sensitive adhesive composition prepared according to the above-described combination method to produce a blend of silicone polyurea block copolymer and MQ resin.

Another example of a useful class of silicone polymers is polydiorganosiloxane polymers. Suitable polydiorganosiloxane polymers include, e.g., polydimethylsiloxane and polydimethyldiphenylsiloxane polymers having silanol functionality or alkenyl functionality.

The silicone polydiorganosiloxane-based silicone pressure-sensitive adhesive compositions can be made by reacting the MQ resin and the polydiorganosiloxane. To achieve such a reaction, two different reaction chemistries have been commonly used: condensation chemistry and addition-cure chemistry.

Briefly, condensation chemistry includes admixing silanol functional MQ tackifying resins that include triorganosiloxy units and $SiO_{4/2}$ units with silanol-endblocked polydiorganosiloxanes as described in, e.g., U.S. Pat. Nos. 2,736,721, 2,814,601, 4,309,520, 4,831,070, 2,857,356, 3,528,940, and 5,308,887, and Great Britain Patent No. 998,232, and incorporated herein. The MQ resin and the polydiorganosiloxane can be intercondensed, which provides intra- and inter-condensation within the adhesive composition. Condensation between the copolymeric silicone resin and the polydiorganosiloxane can be effected either in the presence of catalyst at ambient or elevated temperature, or in the absence of catalyst at elevated temperatures.

A silicone pressure-sensitive adhesive composition that includes the intercondensation product of a silanol functional polydiorganosiloxane and a silanol functional MQ resin, as discussed above, can optionally include a free radical polymerization catalyst, such as a diaryl peroxide crosslinker, to crosslink the adhesive composition, thereby improving the high temperature shear properties of the silicone pressure-sensitive adhesive composition with only a slight loss in peel adhesion as taught in *The Handbook of Pressure-Sensitive Adhesive Technology*, (Satas, 1989) and incorporated herein.

Silicone pressure-sensitive adhesive compositions prepared by addition-cure chemistry generally include polydiorganosiloxanes having alkenyl groups, MQ silicone resins that include $R_3SiO_{1/2}$ and $SiO_{4/2}$ structural units, wherein R is as defined previously having one or more of the following functionalities: silicone-bonded hydrogen, silicone bonded alkenyl groups such as those selected from the group consisting of vinyl, allyl, propenyl and higher alkenyl groups; or silanol, optionally a crosslinking or chain extending agent, and Pt or other noble metal hydrosilation catalyst to effect the curing of the silicone pressure-sensitive adhesive composition. Examples of such compositions are found in U.S. Pat. Nos. 3,527,842; 3,983,298; 4,774,297; European Patent Publication Nos. 355,991, and 393,426, and Kokai HEI 2-58587, and incorporated herein.

Wide ranges of commercially available silicone pressure-sensitive adhesive compositions are also suitable. Examples of such silicone pressure-sensitive adhesive compositions include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. Also useful are various blends of silicone pressure-sensitive adhesive compositions, such as blends of two different dimethylsiloxane-based silicone pressure-sensitive adhesive compositions, as taught in *The Handbook of Pressure-Sensitive Adhesive Technology*, (Satas, 1989), and incorporated herein, or blends of dimethylsiloxane-based silicone pressure-sensitive adhesive compositions with dimethylsiloxane/diphenylsiloxane-based pressure-sensitive adhesive compositions as described in U.S. Pat. No. 4,925,671 and incorporated herein.

The silicone pressure-sensitive adhesive composition layer can be of any suitable thickness. Examples of useful silicone pressure-sensitive adhesive composition thicknesses include from about 0.1 mils to about 40 mils (about 0.0025 millimeters (mm) to about 1 mm) or even from about 1 mil to about 16 mils (about 0.025 mm to about 0.41 mm).

The Layer that Includes a Composition that Includes an Elastomer

A second layer of the multi-layer pressure-sensitive adhesive article includes a composition that includes an elastomer and optionally other components including, e.g., tackifying agents, plasticizers, antioxidants, fillers, pigments, light stabilizers (e.g., ultraviolet ("UV") stabilizers), antiozonants, curing agents, metal deactivators, and combinations thereof. The composition of the second layer can be a pressure-sensitive adhesive composition or non pressure-sensitive. Useful second layers exhibit an elastic recovery of at least about 70%, at least about 80%, at least about 90% or even about 100% as measured according to ASTM D5459-95 entitled, "Standard Test Method for Machine Direction Elastic Recovery and Permanent Deformation and Stress Retention of Stretch Wrap Film."

Suitable elastomers for the composition of the second layer include, e.g., tacky and non-tacky elastomers based on silicone, acrylic resins, natural rubber, polychloroprene (i.e., neoprene), nitrile rubber, butyl rubber, polysulfide rubber, polyisoprene, ethylene-propylene diene rubber (i.e., EPDM rubber), polyurethane, acrylonitrile-butadiene rubber, acrylonitrile-butadiene-styrene, styrene-butadiene rubber, styrene-butadiene-styrene, styrene-isoprene-styrene, styrene-ethylene-propylene-styrene, and styrene-ethylene-butylene-styrene, and mixtures and combinations thereof. These same elastomers alone or in combination can also function as a base elastomer of an elastomer-based pressure-sensitive adhesive composition.

Useful silicone elastomers and silicone-based pressure-sensitive adhesive compositions for the second layer include the silicone polymers and silicone-based pressure-sensitive adhesive compositions set forth above.

A number of useful acrylate-based pressure-sensitive adhesive compositions are described in U.S. Pat. Nos. 4,418,120, 4,554,324, and 5,507,366, and incorporated herein. One example of a useful class of acrylate-based pressure-sensitive adhesive compositions is prepared from starting materials that include from about 60 parts by weight to 100 parts by weight of at least one alkyl acrylate monomer, and optionally from about 0 parts by weight to about 40 parts by weight of a reinforcing co-monomer. Useful alkyl acrylate monomers have a homopolymer glass transition temperature less than about 0° C., and preferably less than about −20° C. Useful alkyl acrylate monomers are monofunctional (meth)acrylic acid esters of non-tertiary alkyl alcohols having from 4 to 20 carbon atoms, from 4 to 18 carbon atoms, or even from 4 to 14 carbon atoms in the alkyl moiety. Examples of useful alkyl acrylate monomers include n-butyl acrylate, n-hexyl acrylate, n-octyl acrylate, isooctyl acrylate, 2-ethylhexyl acrylate, isononyl acrylate, n-decyl acrylate, n-dodecyl acrylate, and mixtures thereof.

The monoethylenically unsaturated reinforcing co-monomer preferably has a homopolymer glass transition temperature (Tg) greater than about 15° C. or even greater than 25° C. and is co-polymerized with the alkyl acrylate monomers. Examples of useful reinforcing co-monomers include acrylic acid, methacrylic acid, itaconic acid, N-vinyl pyrrolidone, N-vinyl caprolactam, substituted methacrylamides and acrylamides, such as N,N-dimethylacrylamide, acrylonitrile, 2-carboxyethyl acrylate, maleic anhydride, and mixtures thereof. Other suitable reinforcing co-monomers include monofunctional unsaturated monomers wherein the relative amount of ester group to hydrocarbon of the alkyl substituents is high and the monomers have a higher solubility parameter relative to the higher alkyl substituted acrylates listed above. Examples of such monomers include methyl acrylate, ethyl acrylate, methylmethacrylate, ethyl methacrylate, vinyl acetate and vinyl propionate. Nonpolar monomers such as isobornyl acrylate may also be used.

When a reinforcing co-monomer is used, the alkyl acrylate monomer is present in the composition in amounts from about 60 parts by weight to about 99 parts by weight and the reinforcing co-monomer is present in amounts from about 1 parts by weight to about 40 parts by weight, wherein the total amount of monomer by weight is 100 parts. The useful amounts of each type of monomer will vary depending upon the desired properties of the adhesive.

Generally, useful starting materials include at least about 2 parts by weight of the reinforcing co-monomer per 100 parts by weight monomer and reinforcing co-monomer, or even at least about 5 parts by weight reinforcing co-monomer. For the acrylate pressure-sensitive adhesives, a useful range for the co-monomer is from about 2 parts by weight to about 30 parts by weight per 100 parts monomer and co-monomer. For acrylate pressure-sensitive adhesives in which the reinforcing co-monomer is acrylic acid or methacrylic acid, a useful range is from about 1 part by weight to about 15 parts by weight per 100 parts monomer and co-monomer.

The acrylate pressure-sensitive adhesives can be polymerized by a number of techniques including, e.g., solvent polymerization, emulsion polymerization, suspension polymerization, bulk polymerization, and radiation polymerization, including processes using ultraviolet light, electron beam, and gamma radiation. The starting materials may include a polymerization initiator, e.g., a thermal initiator or a photo-initiator, of a type and in an amount effective to polymerize the polymerizable alkyl acrylate monomers and the reinforcing co-monomers.

Solvent polymerization techniques are well known in the art and described in various sources including, e.g., U.S. Pat. No. Re 24,906 (Ulrich) and U.S. Pat. No. Re 4,554,324 (Husman et al.) and incorporated herein. Briefly, the procedure is carried out by adding the monomers, a suitable solvent such as ethyl acetate, and an optional chain transfer agent to a reaction vessel, adding a free radical initiator, purging with nitrogen, and maintaining the reaction vessel at an elevated temperature, typically in the range of about 40° C. to 100° C. until the reaction is completed, typically in about 1 to 20 hours, depending upon the batch size and temperature. Suitable free radical initiators are commercially available and include those available from DuPont Company under the VAZO trade designation. Specific examples of free radical initiators include VAZO 64 (2,2'-azobis(isobutyroniltrile) and VAZO 52 2,2'-azobis(2,4-dimethylvaleronitrile). Suitable initiators also include hydroperoxides, e.g., tert-butyl hydroperoxide, and peroxides such as benzoyl peroxide and cyclohexane peroxide.

A useful emulsion polymerization process is described in U.S. Pat. No. Re 24,906 in which monomers are added to a reaction vessel that includes distilled water, an emulsifying agent and suitable initiators, the mixture is purged with nitrogen and heated, typically to a temperature in the range of about 25° C. to 80° C., until the reaction is complete.

Examples of useful bulk polymerization methods for preparation of the acrylate pressure-sensitive adhesives include the continuous free radical polymerization method described in U.S. Pat. Nos. 4,619,979 and 4,843,134; the essentially adiabatic polymerization methods using a batch reactor described in U.S. Pat. No. 5,637,646; and the methods described for polymerizing packaged pre-adhesive compositions described in U.S. Pat. No. 5,804,610.

Useful acrylate-based pressure-sensitive adhesive compositions can also be prepared by radiation polymerization methods in which the adhesive composition, including the monomers and a free radical initiator, is coated onto a flat substrate such as a polymeric film and exposed to an energy source in a low oxygen atmosphere, i.e., less than 1000 parts per million (ppm), preferably less than 500 ppm, until the polymerization is substantially complete, i.e., residual monomers are less than 10%, and preferably less than 5%.

The acrylate-based pressure-sensitive adhesive composition can also include a crosslinking agent to improve the internal strength, solvent resistance and other properties of the pressure-sensitive adhesive composition. The crosslinking agent is preferably present in an amount of from about 0.05% by weight to about 5% by weight based on 100 parts of the alkyl acrylate monomer and optional reinforcing co-monomer.

The crosslinking agents are selected according to the polymerization and coating method used. Useful crosslinking agents for the base copolymers prepared via radiation polymerization methods include multifunctional acrylates including, e.g., 1,6-hexanediol diacrylate, trimethylolpropane triacrylate, pentaerythritol tetracrylate, 1,2-ethylene glycol diacrylate, 1,12-dodecanediol diacrylate, and crosslinking agents disclosed in U.S. Pat. No. 4,379,201 and incorporated herein. Other useful crosslinking agents include substituted triazines including, e.g., 2,4-bis(trichloromethyl)-6-p-methoxystyrene-S-triazine and those substituted triazines disclosed in U.S. Pat. Nos. 4,329,384 and 4,330,590 and incorporated herein, and chromophore halomethyl-S-triazines. Additional useful crosslinking agents include mono-ethylenically unsaturated aromatic ketones, particularly 4-acryloxybenzophenone, as described in U.S. Pat. No. 4,737,559 and incorporated herein, and multifunctional crosslinking agents such as 1,5-bis(4-benzoylbenzoxy)pentane, as described in PCT Patent Publication WO 97/07161 and incorporated herein, and 1,4-butanedi[4-benzoylphenoxy]acetate, as described in U.S. Pat. No. 5,407,971 and incorporated herein.

Crosslinking agents useful in solution and emulsion polymerized acrylate pressure-sensitive adhesives are those that are free radically copolymerizable, that effect crosslinking through exposure to radiation, moisture or heat following polymerization of the base copolymer, and combinations thereof. Crosslinking can occur before or after polymerization and coating. Useful crosslinking agents include the above-mentioned photoactive substituted triazines, multifunctional benzophenone crosslinking agents and mono-ethylenically unsaturated aromatic ketones. Hydrolyzable, free radically copolymerizable crosslinkers, such as mono-ethylenically unsaturated mono-, di- and trialkoxy silane compounds including, e.g., methacryloxypropyl trimethoxysilanes, examples of which are commercially available under the SILANE A-174 trade designation from Union Carbide Chemicals and Plastics Co., vinyldimethylethoxysilane, vinylmethyldiethoxysilane, vinyltriethoxysilane, vinyltrimethoxysilane and vinyltriphenoxysilane. Useful heat activated copolymerizable crosslinking agents including, e.g., N-methylol acrylamide and acrylamido glycolic acid. N-methylol acrylamide and acrylamido glycolic acid can be useful for enhancing the shear strength of an acrylate pressure-sensitive adhesive composition.

A number of block copolymer-based pressure-sensitive adhesive compositions are suitable for use in the multi-layer assembly. Block copolymer-based pressure-sensitive adhesive compositions include block copolymers that include blocks formed from vinyl aromatic compounds (A blocks) including, e.g., styrene, alpha-methyl styrene, tert-butyl styrene, and blocks formed by polymerization of 1,3-dienes (B blocks) including, e.g., butadiene and isoprene. The block copolymers can include identical or different B blocks, which can be partially, selectively or completely hydrogenated. Useful block copolymers include, e.g., linear A-B-A structure block copolymers, radial block copolymer, star-shaped block copolymers, asymmetric star block copolymers, comb block copolymers, and linear multiblock copolymers. The block copolymer also can be in the form of A-B diblock copolymers. Useful block copolymer-based pressure-sensitive adhesive compositions include block copolymer in an amount from about 10% by weight to about 99% by weight, from about 25% by weight to about 75% by weight or even from about 35% by weight to about 60% by weight.

The block copolymer-based pressure-sensitive adhesive composition optionally includes a tackifying agent. Suitable tackifying agents include, e.g., rosin, rosin derivatives, and partially and fully hydrogenated rosins, aromatic hydrocarbon resins, aliphatic hydrocarbon resins, aromatic-aliphatic hydrocarbon resins, terpene resins, phenol-modified resins, and combinations thereof. Useful block copolymer-based pressure-sensitive adhesive compositions include tackifying agent in an amount from about 15% by weight to about 75% by weight, from about 30% by weight to about 65% by weight or even from about 35% by weight to about 60% by weight.

The block copolymer-based pressure-sensitive adhesive composition can also include other copolymers including, e.g., natural rubber, synthetic polyisoprenes, polybutadienes, polychloroprenes, styrene-butadiene rubber, ethylene vinyl acetate, polyvinyl acetates, and combinations thereof.

The block copolymer based pressure-sensitive adhesive composition optionally can be crosslinked through radiation including, e.g., ultraviolet light, gamma radiation, electron beam radiation, and combinations thereof.

Examples of useful block copolymer-based pressure-sensitive adhesive compositions are disclosed in U.S. Pat. No. 6,280,840 and incorporated herein.

The pressure-sensitive adhesive compositions can include other additives including, e.g., fillers (e.g., reinforcing and non-reinforcing fillers), compatibilizers, plasticizers, tackifiers, antioxidants, stabilizers (e.g., ultraviolet ("UV") light stabilizers), antiozonants, curing agents, metal deactivators, pigments, blowing agents, toughening agents, reinforcing agents, fire retardants, and combinations thereof. Examples of useful fillers include silica (e.g., hydrophobic and hydrophilic silica), glass (e.g., ground glass, glass beads and glass bubbles), aluminas, zinc oxides, calcium carbonates, titanium dioxides, carbon blacks, polymeric bubbles and beads (including expanded and unexpanded beads and bubbles), synthetic fibers, and combinations thereof. The pressure-sensitive adhesive compositions can include additives in amounts sufficient to obtain the desired end properties.

Useful compatibilizers assist in increasing interlayer adhesion including, e.g., adhesion between a pressure-sensitive adhesive layer of the construction and another layer (e.g., other pressure-sensitive adhesive layers, other elastomeric layers, and backings) of the multi-layer construction. Examples of useful compatibilzers for acrylic adhesives and methods of making the same are described in U.S. Pat. Nos. 6,630,239 and 6,379,791 and incorporated herein.

The thickness of the additional layer(s) (e.g., elastomer and adhesive) can be any useful thickness including, e.g., from about 0.1 mils to about 40 mils (about 0.0025 mm to about 1 mm) or even from about 1 mil to about 16 mils (about 0.025 mm to about 0.41 mm).

Backing

Figure 3:
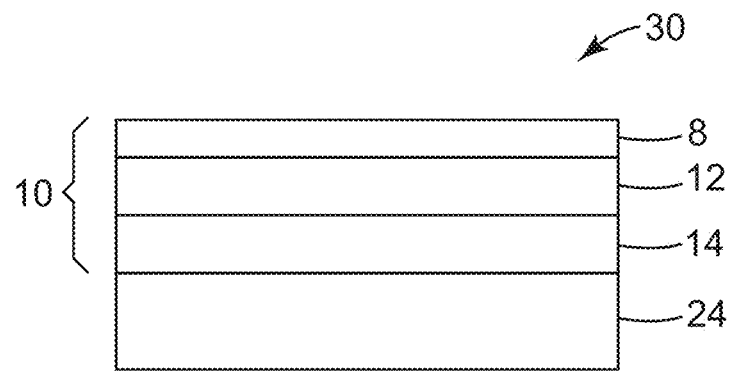
FIG. 3 is a side view of an embodiment of a multi-layer pressure-sensitive adhesive assembly that includes a backing.

The multi-layer pressure-sensitive adhesive assembly optionally includes a backing FIG. 3 illustrates an embodiment of a multi-layer pressure-sensitive adhesive assembly 30 that includes a backing 24, a second layer 14 disposed on the backing 24, a first layer 12 disposed on the second layer 14 and a release liner 8 disposed on the first layer.

Figure 4:
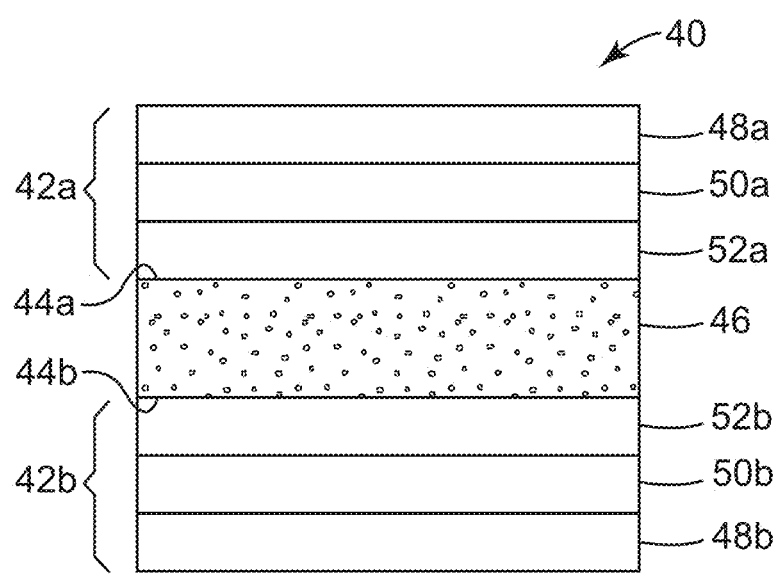
FIG. 4 is a side view of another embodiment of a multi-layer pressure-sensitive adhesive assembly.

FIG. 4 illustrates an embodiment of a multi-layer pressure-sensitive adhesive assembly 40 that includes a first multi-layer assembly 42a disposed on a first major surface 44a of a backing 46 and a second multi-layer assembly 42b disposed on a second major surface 44b of the backing 46. The first multi-layer assembly 42a includes a release liner 48a, a first layer 50a that includes a silicone-based pressure-sensitive adhesive composition in contact with the release liner 48a, a second layer 52a disposed between the first layer 50a and the backing 46. The second layer 52a includes a composition that includes an elastomer. The second multi-layer assembly 42b includes a release liner 48b, a first layer 50b that includes a silicone-based pressure-sensitive adhesive composition in contact with the release liner 48b, and a second layer 52b that includes a composition that includes an elastomer disposed between the first layer 50b and the backing 46.

The backing can be in a variety of forms including, e.g., polymer films, paper, cardboard, stock card, woven and nonwoven webs, fiber reinforced films, foams, composite film-foams, and combinations thereof. One useful class of backings exhibits an elastic recovery of no greater than about 50%, no greater than about 30% or even no greater than about 10% as measured according to ASTM D5459-95 entitled, "Standard Test Method for Machine Direction Elastic Recovery and Permanent Deformation and Stress Retention of Stretch Wrap Film."

The backing can include a variety of materials including, e.g., fibers, cellulose, wood, foam, and thermoplastic polymers including, e.g., polyolefins (e.g., polyethylene including, e.g., high density polyethylene, low density polyethylene, linear low density polyethylene, and linear ultra low density polyethylene), polypropylene, and polybutylenes; vinyl copolymers (e.g., polyvinyl chlorides, plasticized and unplasticized polyvinyl chlorides, and polyvinyl acetates); olefinic copolymers including, e.g., ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations thereof. Suitable blends also include, e.g., blends of thermoplastic polymers, elastomeric polymers and combinations thereof including, e.g., polypropylene/polyethylene, polyurethane/polyolefin, polyurethane/polycarbonate, and polyurethane/polyester. Useful polyethylene vinyl acetate copolymer foams are available under the VOLEXTRA and VOLARA series of trade designations from Voltek, Division of Sekisui America Corporation (Lawrence, Mass.).

Useful polymer films include, e.g., a single-layer films, multi-layer films, porous and nonporous films, and combinations thereof. The polymer film can also be a filled material such as filled film (e.g., calcium carbonate filled polyolefin). The polymer film can be a continuous layer or a discontinuous layer. Multi-layer polymer films are preferably integrally bonded to one another in the form of a composite film, a laminate film and combinations thereof. The polymer films can be made integral to one another using any suitable method including, e.g., co-molding, coextruding, extrusion coating, joining through an adhesive, joining under pressure, joining under heat, and combinations thereof. The polymer film can have any suitable thickness including, e.g., from about 0.4 mils to about 10 mils or even from about 0.4 mils to about 6 mils.

To improve adhesion of a layer of the multi-layer pressure-sensitive adhesive article to the backing, the backing can be pretreated prior to applying, e.g., coating or laminating, the adhesive composition on the backing Examples of suitable treatments include corona discharge, plasma discharge, flame treatment, electron beam irradiation, ultraviolet (UV) radiation, acid etching, chemical priming and combinations thereof. The treatment can optionally be performed with a reactive chemical adhesion promoter including, e.g., hydroxyethylacrylate, hydroxyethyl methacrylate, another reactive species of low molecular weight and combinations thereof. Examples of useful chemical primers are disclosed in U.S. Pat. No. 5,677,376 (Groves) and U.S. Pat. No. 6,008,286 (Groves), and incorporated herein.

Figure 5A:
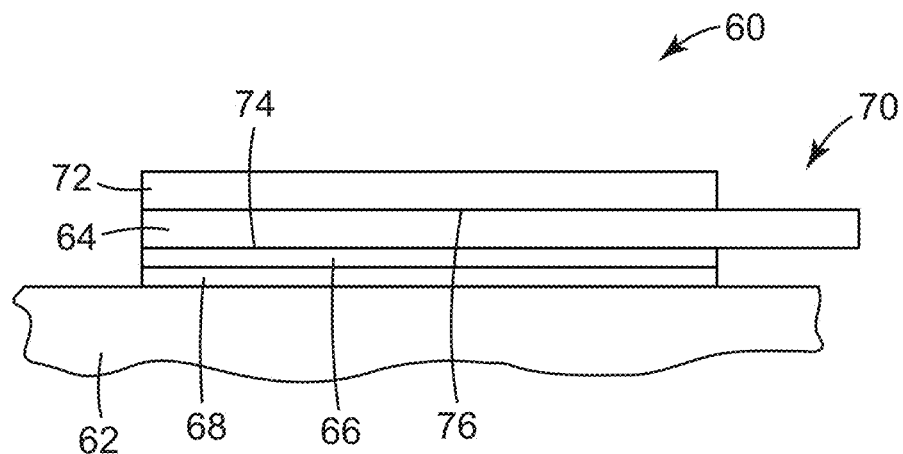
FIG. 5A is a sectional side view of a multi-layer stretch releasing pressure-sensitive adhesive assembly adhered to a substrate.

In some embodiments, the multi-layer pressure-sensitive adhesive assembly is constructed to exhibit stretch releasing properties. FIG. 5A illustrates an embodiment of the multi-layer pressure-sensitive adhesive assembly 60 in the form of a multi-layer stretch releasing pressure-sensitive adhesive article (68, 66) bonded to a substrate 62 through pressure-sensitive adhesive layer 68. The multi-layer stretch releasing pressure-sensitive adhesive assembly 60 includes a first layer of pressure-sensitive adhesive 68 disposed on a second layer of pressure-sensitive adhesive 66, which is in turn disposed on a first major surface 74 of a backing 64. A third layer 72 of a pressure-sensitive adhesive composition disposed on a second major surface 76 of the backing 64 opposite the first major surface 74. The first layer of pressure-sensitive adhesive 68 is in contact with a substrate 62.

A multi-layer stretch releasing pressure-sensitive adhesive assembly, when adhered to a substrate through a pressure-sensitive adhesive composition, exhibits stretch releasing properties including, e.g., being extensible, stretchable and cleanly removable (i.e., is substantially free of visible residue) from at least one of a variety of substrates (e.g., glass, ceramic, drywall, painted drywall, and finished, e.g., stained and varnished, wood) without damaging the substrate. In some embodiments, the multi-layer stretch releasing pressure-sensitive adhesive assembly is constructed to maintain adhesion, while holding a shear load of 2.4 lb per square inch of adhesive area and being exposed to a 115° F. water spray for a period, of at least 10,000 minutes, at least 30,000 minutes or even at least 45,000 minutes.

For multi-layer stretch releasing pressure-sensitive adhesive assemblies that include a backing, the backing can be elongated through stretching in the lengthwise direction and is highly extensible. The term "highly extensible" as used herein means that when the backing is stretched in the lengthwise direction, an elongation of at least about 150% is achieved based on the original length. The backing of a stretch releasing pressure-sensitive adhesive assembly preferably is capable of achieving an elongation of from about 50% to about 1,200%, from about 150% to about 700%, or even from about 350% to about 700%.

Suitable backings for multi-layer stretch releasing pressure-sensitive adhesive assemblies include, e.g., a single layer of foam, multiple layers of foam, a single layer of film, multiple layers of film and combinations thereof. Examples of useful polymeric backing materials for stretch releasing pressure-sensitive adhesive assemblies are disclosed in U.S. Pat. No. 5,516,581 and PCT Application No. WO 95/06691, and incorporated herein.

A useful foam layer for a backing of a multi-layer stretch releasing pressure-sensitive adhesive assembly is conformable and assists in increasing the degree of surface contact between the pressure-sensitive adhesive composition disposed thereon and the surface. The foam layer preferably is capable of achieving from about 50% to about 600% elongation, and preferably exhibits an elongation at break that is sufficiently high such that the substrate is not ruptured prior to removal of the multi-layer pressure-sensitive adhesive assembly from the surface to which the assembly is adhered.

Polymeric foams can be selected to optimize properties such as conformability and resiliency, which are useful when the article is to be adhered to surfaces having surface irregularities, e.g., painted drywall. Conformable and resilient polymeric foams are well suited for applications in which the adhesive article is to be adhered to surfaces having surface irregularities. The foam layer preferably has a density of at least about 2 pounds per cubic foot (pcf), at least about 6 pcf, at least about 8 pcf, or at least about 12 pcf, less than about 30 pcf, less than about 25 pcf or even less than about 15 pcf. The foam layer can have any thickness suitable for the intended application. Examples of a useful foam caliper (i.e., thickness) include at least about 5 mils, greater than about 30 mils (about 0.76 mm), no greater than about 1000 mils (about 25 mm) or even no greater than about 125 mils. In some embodiments the foam layer includes multiple layers of foam, each layer of foam having the same or different properties including, e.g., density, thickness, % elongation, breaking strength, and combinations thereof.

The foam layer can be prepared from a variety of thermoplastic polymers including, e.g., polyolefins (e.g., polyethylene including, e.g., high density polyethylene, low density polyethylene, linear low density polyethylene, and linear ultra low density polyethylene), polypropylene, and polybutylenes; vinyl copolymers (e.g., polyvinyl chlorides, plasticized and unplasticized polyvinyl chlorides, and polyvinyl acetates); olefinic copolymers including, e.g., ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations thereof. Suitable blends also include, e.g., blends of thermoplastic polymers, elastomeric polymers and combinations thereof including, e.g., polypropylene/polyethylene, polyurethane/polyolefin, polyurethane/polycarbonate, and polyurethane/polyester. Useful polyethylene vinyl acetate copolymer foams are available under the VOLEXTRA and VOLARA series of trade designations from Voltek, Division of Sekisui America Corporation (Lawrence, Mass.).

Particularly useful polymer films for use in the backing of a multi-layer stretch releasing pressure-sensitive adhesive assembly have a lengthwise elongation at break of from about 50% to about 1,200%, from about 150% to about 700%, or even from about 350% to about 700%, and a Young's modulus of at least about 1,000 psi (about 6,894. 7 KPa), at least about 2,500 psi (about 17,236. 8 KPa), or even at least about 3,000 psi (about 20,684. 1 KPa), no greater than about 72,500 psi (about 499,865. 8 KPa), no greater than about 50,000 psi (about 344,735 KPa), or even from about 5,000 psi to about 30,000 psi (about 34,473.5 KPa to 206,841 KPa). The polymer film preferably is capable of achieving the desired elongation at break in at least one of the machine direction and the cross direction of the film. The polymer film preferably exhibits an elongation at break that is sufficiently high such that the multi-layer stretch releasing pressure-sensitive adhesive assembly does not rupture prior to removal of the assembly from the surface to which the assembly is adhered.

Suitable polymer films are formed from a variety of thermoplastic polymers including, e.g., polyolefins (e.g., polyethylene including, e.g., high density polyethylene, low density polyethylene, linear low density polyethylene, and linear ultra low density polyethylene), polypropylene, and polybutylenes; vinyl copolymers (e.g., polyvinyl chlorides, plasticized and unplasticized polyvinyl chlorides, and polyvinyl acetates); olefinic copolymers including, e.g., ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations thereof. Suitable blends also include, e.g., blends of thermoplastic polymers, elastomeric polymers and combinations thereof including, e.g., polypropylene/polyethylene, polyurethane/polyolefin, polyurethane/polycarbonate, and polyurethane/polyester.

In some embodiments, the highly extensible polymer film is in the form of a multi-layer film. The polymer film can be in a variety of forms including, e.g., a single-layer or multi-layer film, a porous film, and combinations thereof. The polymer film may also be a filled material such as filled film (e.g., calcium carbonate filled polyolefin). The polymer film can be a continuous layer or a discontinuous layer. Multi-layer polymer films are preferably integrally bonded to one another in the form of a composite film, a laminate film and combinations thereof. The polymer films can be made integral to one another using any suitable method including, e.g., co-molding, coextruding, extrusion coating, joining through an adhesive, joining under pressure, joining under heat, and combinations thereof. The polymer film preferably has a thickness of from about 0.4 mils to about 10 mils or even from about 0.4 mils to about 6 mils.

Useful commercially available thermoplastic polymer films include, e.g., metallocene catalyzed linear low density polyethylene films available under the XMAX series of trade designations and linear low density polyethylene films available under the MAXILENE series of trade designations (e.g., MAXILENE 200) both of which are available from Pliant Corporation (Chippewa Falls, Wis.).

A film layer of a backing can be bonded to the layer of foam using any suitable mechanism including, e.g., coextruding the film and the foam layer, co-molding, extrusion coating, joining through an adhesive composition, joining under pressure, joining under heat, and combinations thereof. Useful adhesive compositions for bonding a film layer to the foam layer include the adhesive compositions set forth below. Where only one polymeric film or foam layer of a multi-layer backing is intended to be stretched to effect debonding, that layer should exhibit sufficient physical properties and be of a sufficient thickness to achieve that objective.

Polymeric films may be used to increase load bearing strength and rupture strength of the assembly. Films are particularly well suited to applications involving adhering smooth surfaces together. A polymeric film layer preferably has a thickness of about 0.4 to about 10 mils, more preferably from about 0.4 to about 6 mils.

The backing optionally includes an elastomeric material. Suitable elastomeric backing materials include, e.g., styrene-butadiene copolymer, polychloroprene (i.e., neoprene), nitrile rubber, butyl rubber, polysufide rubber, cis-1,4-polyisoprene, ethylene-propylene terpolymers (e.g., EPDM rubber), silicone rubber, silicone polyurea block copolymers, polyurethane rubber, polyisobutylene, natural rubber, acrylate rubber, thermoplastic rubbers, e.g., styrene-butadiene block copolymers and styrene-isoprene-styrene block copolymers, and thermoplastic polyolefin rubber materials.

Examples of useful pressure-sensitive adhesive assemblies and backings are described in U.S. Pat. No. 4,024,312 (Korpman), U.S. Pat. No. 5,516,581 (Kreckel et al.), U.S. Pat. No. 6,001,471 (Bries et al.) and U.S. Pat. No. 6,004,642 (Langford) and PCT International Publication WO 95/06691 and incorporated herein. Other examples of useful backings include splittable layer backings as described in PCT International Publication WO 98/21285 and re-fastenable layer backings as described in PCT International Publication WO 99/31193, and incorporated herein.

Other useful stretch releasing pressure-sensitive adhesive compositions and constructions are described in U.S. Pat. No. 6,280,840 (Luhmann et al.) and U.S. Pat. No. 5,897,949 (Luhmann et al.) and incorporated herein.

Tab

The multi-layer stretch releasing pressure-sensitive adhesive assembly optionally includes a non-tacky tab. The non-tacky tab can be grasped and pulled by a user to stretch the multi-layer stretch releasing pressure-sensitive adhesive assembly during the removal process, so as to remove the assembly from the object or substrate to which it has been affixed. The tab can exist in a variety of forms. In one embodiment, the tab is a portion of the backing that is free of pressure-sensitive adhesive composition. In other embodiments, the tab includes a cover layer that is adhered to and covers over the pressure-sensitive adhesive composition. In another embodiment, the tab is a separate component that is affixed to an end portion of the backing. In another embodiment, the tab is created by detackifying the pressure-sensitive adhesive composition using any suitable method including, e.g., applying powder (e.g., baking powder (i.e., calcium carbonate) and titanium dioxide), exposure to radiation (e.g., ultraviolet light), over coating with varnish or ink, and combinations thereof.

Figure 5B:
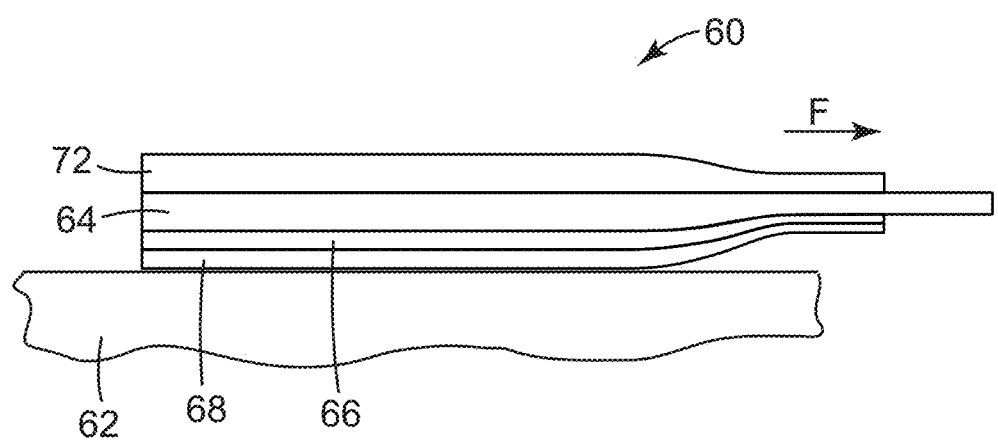
FIG. 5B is a sectional side view of a partially stretched assembly of FIG. 5A.

A multi-layer stretch releasing pressure-sensitive adhesive assembly can be debonded from the substrate through stretching. A schematic illustration of debonding of the multi-layer stretch releasing pressure-sensitive adhesive assembly 60 that includes a non-tacky tab 70 from a substrate 62 is shown in FIG. 5B. A force (F) is applied to the multi-layer stretch releasing pressure-sensitive adhesive assembly 60 in a direction substantially parallel to the surface of the substrate 62. The bonded structure exhibits a relatively high initial resistance to shearing stress. When sufficient force is applied to the multi-layer stretch releasing pressure-sensitive adhesive assembly 60 to overcome this resistance, the backing 64 begins to deform as illustrated in FIG. 5B. The backing 64 yields while the pressure-sensitive adhesive layer 68 elongates and releases from the substrate 62. The stretching angle of the multi-layer stretch releasing pressure-sensitive adhesive assembly 60 is usually in a direction substantially parallel to the surface of the substrate 62 at an angle of no greater than about 35 degrees, no greater than about 30 degrees, or even no greater than about 10 degrees from the substrate surface. Removal at the appropriate angle will result in leaving no visible adhesive residue on the substrate and will prevent the surface from being damaged.

Method of Making the Multi-Layer Assembly

The multi-layer assembly can be prepared using any suitable method including, e.g., coating the layers directly on each other (e.g., simultaneously, sequentially and combinations thereof), forming a first layer (e.g., by coating a composition on a release liner) and subsequently laminating the first layer to a second layer, coextruding at least two of the layers, and combinations thereof. One useful method of making the multi-layer assembly includes coating the silicone-based pressure-sensitive adhesive composition on a release liner and subsequently coating a second composition directly on the silicone-based pressure-sensitive adhesive composition. The second composition can be coated on the silicone-based pressure-sensitive adhesive composition while the silicone-based pressure-sensitive adhesive composition is still wet. The second composition can be uncured (i.e., wet, molten, uncrosslinked or only partially crosslinked) when it is coated on the silicone-based pressure-sensitive adhesive composition. Other useful coating methods include slot die, knife, slot fed knife, gravure, rod, curtain coating, and other methods for coating solvent, water-based and hot melt compositions.

In another embodiment, the silicone-based pressure-sensitive adhesive composition is in a cured state (e.g., at least partially crosslinked, at least partially dried, or a combination thereof) at the time that the composition of the second layer is coated thereon. The composition of the second layer can be cured or uncured.

The term "cured" in reference to the coating method is used to broadly refer to a composition that is solid (e.g., in the case of a hot melt composition), dry or at least partially dry (e.g., in the case of a composition that includes a fugitive liquid carrier (e.g., water and organic liquids), crosslinked or at least partially crosslinked (e.g., in the case of a composition that is crosslinkable), and combinations thereof.

The term "uncured" in reference to the coating method is used broadly to refer to a composition that is molten (e.g., in the case of a hot melt composition), wet (e.g., in the case of a composition that includes a fugitive liquid carrier (e.g., water and organic liquids), uncrosslinked or partially crosslinked (e.g., in the case of a composition that is crosslinkable), and combinations thereof.

The individual layers of the multi-layer article can be continuous or discontinuous. The individual layers of the multi-layer article can also be self-supporting or supported by another layer, substrate (e.g., a backing) and combinations thereof.

To improve adhesion of one pressure-sensitive adhesive layer to another layer (e.g., another pressure-sensitive adhesive layer or an elastomeric layer), at least one of the layers can be treated to improve interlayer adhesion. Examples of useful treatment methods include, e.g., chemical priming, corona discharge, plasma discharge, flame treatment, electron beam irradiation, ultraviolet (UV) radiation, acid etching, and combinations thereof. The treatment can optionally be performed with a reactive chemical adhesion promoter including, e.g., hydroxyethylacrylate, hydroxyethyl methacrylate, another reactive species of low molecular weight and combinations thereof. In one method, a primer is applied to the surface of the pressure-sensitive adhesive layer prior to contacting the layer with a second layer (e.g., elastomer or pressure-sensitive adhesive composition). Examples of useful primers are described, e.g., in U.S. Pat. Nos. 5,677,376 (Groves) and 6,008,286 (Groves), and incorporated herein.

A stretch releasing pressure-sensitive assembly can be formed using any suitable method for preparing pressure-sensitive adhesive assemblies including, e.g., coating a composition directly on a substrate (e.g., a backing), forming a layer (e.g., by coating a composition on a release liner) and subsequently laminating the layer to a backing, coextruding, and combinations thereof.

A variety of methods for preparing stretch releasing pressure-sensitive adhesive assemblies can be used to form the multi-layer stretch releasing pressure-sensitive adhesive assembly. In some methods, a composition of the multi-layer assembly is coated directly onto a substrate (e.g., a backing), formed as a separate layer (e.g., coated onto a release liner) and then laminated to a layer (e.g., a backing, another layer (e.g., an elastomer or a pressure-sensitive adhesive layer), or a combination thereof. Examples of useful methods of making stretch releasing pressure-sensitive adhesive articles and assemblies are also described in U.S. Pat. Nos. 6,569,521, 6,403,206, 6,001,471 and 5,516,581 and PCT Publication No. WO 2005/059055, and incorporated herein.

The multi-layer stretch releasing pressure-sensitive adhesive assembly can be constructed in a variety of forms including, e.g., a tape, a strip, a sheet, a web, a roll, a label, and combinations thereof.

Use

The multi-layer pressure-sensitive adhesive articles and assemblies described herein are suitable for use in a variety of applications including, e.g., bonding two substrates together, mounting applications using articles including, e.g., hooks, hangers, and holders, e.g., holders for razors, sponges, shampoo bottles, towels, articles that are located in wet or high humidity environments such as those found in bathrooms, e.g., toilets (including, e.g., toilet tanks), tubs, sinks, and walls, showers, locker rooms, steam rooms, pools, hot tubs, kitchens, e.g., kitchen sinks, dishwashers and back splash areas, refrigerators and coolers, and articles that are used in low temperatures applications including outdoor applications and refrigerators. Useful outdoor applications include bonding articles including, e.g., signage, to outdoor surfaces such as windows and vehicles. In some embodiments, the multi-layer stretch releasing pressure-sensitive adhesive article is well suited for adhesion to glass (e.g., windows), ceramic, marble, granite, or a combination thereof.

The multi-layer stretch releasing pressure-sensitive adhesive articles and assemblies can be used in a variety of other constructions and applications including, e.g., (1) mounting applications on surfaces such as painted drywall, plaster, concrete, glass, ceramic, fiberglass, metal or plastic, wall hangings, organizers, holders, baskets, containers, decorations, e.g., holiday decorations, calendars, posters, dispensers, wire clips, body side molding on vehicles, carrying handles, signage applications, e.g., road signs, vehicle markings, transportation markings, and reflective sheeting; (2) joining and assembling applications including, e.g., adhering at least two containers, e.g., boxes, for later separation; (3) cushioning and sound deadening applications including, e.g., cushioning materials for placement beneath objects, sound insulative sheet materials, and combinations thereof; (4) closure applications including, e.g., container closures, e.g., box closures, closures for food containers, closures for beverage containers, diaper closures, and surgical drape closures; (5) vibration damping; (6) sealing applications, e.g., gaskets, for liquids, vapors (e.g., moisture), and dust; (7) thermal insulation; (8) labeling, e.g., removable labels including, e.g., notes, price tags, and identification labels on containers, and signage; (9) medical applications (e.g., bandages, medical device labeling (e.g., in hospital settings) wound care); (10) fastening applications, e.g., fastening one object, e.g., a vase, to another object, e.g., a table or a book shelf; (11) securing applications, e.g., fastening one or more components of a locking mechanism to a substrate, e.g., a child safety lock to a cabinet or cupboard; (12) tamper indicating applications (e.g., tamper indicating articles); and (13) wire and cord organizers, holders, and clips.

The multi-layer stretch releasing pressure-sensitive adhesive articles and assemblies can also be incorporated in a variety of other constructions including, e.g., abrasive articles (e.g., for sanding), articles for sanding and polishing applications (e.g., buffing pads, disc pads, hand pads, and polishing pads), pavement marking articles, and carpeting (e.g., backing for carpeting).

The multi-layer stretch releasing pressure-sensitive adhesive articles and assemblies can be provided in any useful form including, e.g., tape, strip, sheet (e.g., perforated sheet), label, roll, web, disc, and kit (e.g., an object for mounting and the multi-layer stretch releasing pressure-sensitive adhesive assembly). Likewise multiple multi-layer stretch releasing pressure-sensitive adhesive articles and assemblies can also be provided in any suitable form including, e.g., tape, strip, sheet (e.g., perforated sheet), label, roll, web, disc, kit, stack, tablet, and combinations thereof in any suitable package including, e.g., dispenser, bag, box, and carton.

A variety of objects can be used to mount articles on the multi-layer stretch releasing pressure-sensitive adhesive articles and assemblies including, e.g., hooks, separable connector systems, examples of which are described in U.S. Pat. Nos. 6,972,141, 6,692,807 and 6,572,945 and incorporated herein, and combinations thereof. Suitable hook configurations for use in combination with a stretch releasing pressure-sensitive adhesive article for mounting applications are described in U.S. Pat. No. 5,507,464 and U.S. Des. Pat. Nos. D386,067 and D480,292, and incorporated herein.

The multi-layer stretch releasing pressure-sensitive adhesive article and assembly can also be a component of an article that includes a substrate, e.g., a mounting device, and a stretch releasing pressure-sensitive adhesive article adhered to a surface of the substrate. The article can include a release liner disposed on an adhesive surface of the multi-layer stretch releasing pressure-sensitive adhesive article or assembly that is not in contact with the substrate.

The multi-layer stretch releasing pressure-sensitive adhesive article or assembly can also be a component of a kit that includes, e.g., at least one tape and each tape may have a different property, e.g., dimensions, and at least one device, e.g., hook, holder, hanger, decoration, part, label or a combination thereof, packaged together as a unit.

The invention will now be described by way of the following examples.

EXAMPLES

Test Procedures

Test procedures used in the examples include the following.

180° Peel Adhesion Test Method

Samples are tested for 180° peel strength tested according to ASTM D3330/D3330M-04, "Standard Test Method for Peel Adhesion of Pressure-Sensitive Tape at 180° Angle," according to Test Method E on a glass substrate.

Release Force Test Method

The adherence of a layer to a release liner is tested according to ASTM D3330/D3330M-04 entitled, "Standard Test Method for Peel Adhesion of Pressure-Sensitive Tape," according to Test Method D with the following modifications. Test samples evaluated were of dimension 0.5 in (inch)×5 in (1.27 cm (centimeter)×12.7 cm). Samples were tested using a Thwing Albert Friction/Peel Tester operating with a 1 second pre-peel followed with a 20 second response measurement time during which the peel force was averaged. Three samples were tested with the average peel force reported.

Static Shear Test Method

Static shear is determined according to the method of ASTM D3654-82 entitled, "Holding Power of Pressure-Sensitive Tapes," with the following modifications. The release liner(s), where present, is removed from the test sample. Test samples having the dimensions 0.5 in (inch)×0.5 in (1.27 cm (centimeter)×1.27 cm) are adhered to the test substrate through the adhesive composition at 72° F. (i.e., 22° C.) and 50% relative humidity by passing a 15 lb (6.8 kg) hand held roller over the length of the sample two times at a rate of 12 in/min (30.48 cm/min). A metal vapor coated polyester film having the dimensions 0.75 in×4 in (1.91 cm×10.16 cm) is bonded to one side of the adhesive test sample for the purpose of attaching the load.

The test sample is allowed to dwell on the test substrate for 1 hour at 22° C. and 50% relative humidity; thereafter a 1 kg weight is applied to the metal vapor coated polyester film. The time to failure is recorded in minutes and the average value, calculated pursuant to procedures A and C of section 10.1 of the standard, for all of the test samples is reported. Six samples are tested and the average time to failure of the six samples and the failure mode (where present) of each sample is recorded. A value is reported with a greater than symbol (i.e., >) when at least one of the six samples has not failed at the time the test is terminated.

Debond Force Test Method

A conventional variable angle peel jig is modified to be used with an IMASS adhesion tester (Imass, Inc., Hingham, Mass.) to measure low angle debond forces for adhesive tape adhered to a test surface. The jig can securely hold a 5.08 cm×30.5 cm (2 in×12 in) substrate. The jig is secured to the IMASS platen.

A 1.59 cm×6.99 cm (5/8 in×2.75 in) test sample is adhered to the substrate of interest to provide a bond area of 1.59 cm×5.08 cm (5/8 in×2 in). The test sample has a 1.59 cm×1.91 cm (5/8 in×3/4 in) non-adhering tab for clamping to the IMASS tester.

A 1.59 cm×5.08 cm×0.16 cm (1/16 in) high impact polystyrene flat piece is bonded to the side of a test sample opposite the substrate. The test sample is then conditioned for 24 hours under conditions of 50% relative humidity and 22.2° C. and then debonded at a peel speed of 76.2 cm/min (30 in/min) and at a peel angle of 2°.

The average debond force required to stretch the backing for removal from the substrate is recorded in units of ounces per 5/8 in width. Three measurements are made from each substrate and the results are averaged.

% Extension at Debond Test Method

The total extension of the backing, relative to the initial bond length, at the time of complete debond from the adhered substrate is measured with a ruler to determine the % extension at debond according to the following calculation:

$$\% \text{ Extension at Debond} = (AD/I)*100$$

where I is the length of the backing prior to debonding (i.e., stretch release), and AD is the length of the backing after debonding (i.e., stretch release).

Three independent determinations are made from each substrate and the results averaged.

Multi-Layer Adhesive Thickness Measurement

A multi-layer sample is conditioned for 30 minutes on dry ice and immediately thereafter slit with a razor to reveal a cross-section region of the multi-layer sample. The cross-section region is viewed through a FLEXBAR OPTI-FLEX VISION SYSTEM (Flexbar Machine Corp., Islandia, N.Y.) equipped with VISIONGAUGE video microscope software (VISIONx Inc., Pointe-Claire, Quebec, Canada). The cross-section field of view of the interface between the layers of the multi-layer sample is digitally imaged, and, optionally, the thickness of a layer is measured.

Method of Measuring Thickness

The thickness of a sample is measured using an Ono Soki ST-022 digital gauge. Multiple measurements are taken at random locations across the sample and the average thickness is recorded in units of inches (in).

Materials

36 Mil Multi-Layer Composite Foam Laminate Backing

The 36 mil multi-layer composite foam laminate backing includes a polyethylene vinyl acetate copolymer foam having a density of 6 pounds per cubic foot laminated between two pieces of 0.0046 cm (1.80 mil) thick linear low-density polyethylene film. The film layers of the composite foam laminate are treated with a chemical primer prepared according to Example 15 of U.S. Pat. No. 5,677,376 (Groves) prior to adhesive lamination.

SYL-OFF Q2-7786 Release Liner

The SYL-OFF Q2-7786 release liner is a 35 pound bleached Kraft paper sandwiched between two 11.5 pound high density polyethylene corona treated film layers one of which includes a matte finish and the other of which includes a gloss finish (Loparex, Willowbrook, Ill.). The exposed surface of the matte finish polyethylene film layer includes approximately 2.5 grams per square meter (gsm) of the reaction product of Q2-7786 fluorosilicone polymer (Dow Corning Corp., Midland, Mich.), Q2-7560 crosslinking agent (Dow Corning Corp.) and platinum-based catalyst (Dow Corning Corp.) and the exposed surface of the gloss finish polyethylene film layer includes approximately 1.5 gsm of the reaction product of Q2-7785 fluorosilicone polymer (Dow Corning Corp.), Q2-7560 crosslinking agent and platinum catalyst.

SYL-OFF Q2-7785 Release Liner

The SYL-OFF Q2-7785 release liner is a REXAM polyester release liner (Loparex, Willowbrook, Ill.) surface treated with the reaction product of Q2-7785 fluorosilicone polymer, Q2-7560 crosslinking agent and platinum-based catalyst.

Silicone Release Liner

The silicone release liner is a 54.5 pound per 3000 square feet paper stock coated on its two major surfaces with silicone release composition 2-3.2 RLS-4000 MHS 6030S (Loparex, Willowbrook, Ill.).

Preparation of the Pressure-Sensitive Adhesive Compositions

Pressure-Sensitive Adhesive Composition 1 (PSA1)

A pressure-sensitive adhesive composition was prepared according to the method of Example 27 of U.S. Pat. No. 6,569,521 (Sheridan), and incorporated herein, with the exception that the amount of each component was altered to achieve a pressure-sensitive adhesive composition with MW PDMS diamine (/1000)/moles Dytek A polyamine/% by weight MQ resin of 33/0.5/50.

Pressure-Sensitive Adhesive Composition 2 (PSA2)

A pressure-sensitive adhesive composition was prepared according to composition D of U.S. Pat. No. 6,231,962 (Bries) and incorporated herein.

Pressure-Sensitive Adhesive Composition 3 (PSA3)

A pressure-sensitive adhesive composition was prepared according to the method used in preparing Pressure-Sensitive Adhesive Composition 1 with the exception that the amount of each component was altered to achieve a pressure-sensitive adhesive composition having MW PDMS diamine (/1000)/moles Dytek A polyamine/% by weight MQ resin of 14/0.25/50.

Elastomer Composition 1 (EC1)

An elastomer blend was prepared by combining 65 parts FINAPRENE 411 radial styrene-butadiene-styrene thermoplastic elastomer and 35 parts FINAPRENE 1205 di-block styrene-butadiene copolymer (both of which are available from Total Petrochemicals, Brussels, Belgium), with addition of toluene to adjust final solids of the solution mixture to 40% after shear mixing.

Pressure-Sensitive Adhesive Composition 4 (PSA4)

In a glass reaction bottle was placed 169.2 grams isooctyl acrylate, 10.8 grams glacial acrylic acid (available from Dow Chemical, Michigan), 220.0 grams of ethyl acetate and 0.27 grams of VAZO 64 2,2'-azobis(isobutyronitrile) free radical initiator (E.I. DuPont Company, Delaware). The reaction bottle and contents were purged with one liter per minute nitrogen for two minutes and sealed. The reaction bottle was placed in a 60° C. bath and tumbled therein for 24 hours. An additional 320 grams of ethyl acetate was added to the composition for dilution. The resulting pressure-sensitive adhesive composition had a measured solids content equal to 24.78% and an inherent viscosity, measured in ethyl acetate, of 1.29 dl/g (deciliters per gram).

Pressure-Sensitive Adhesive Composition 5 (PSA5)

A pressure-sensitive adhesive composition was prepared according to the method of Pressure-Sensitive Adhesive Composition 1 with the exception that the amount of each component was altered to achieve a pressure-sensitive adhesive composition having a MW PDMS diamine (/1000)/moles Dytek A polyamine/% by weight MQ resin of 14/1/50.

Pressure-Sensitive Adhesive Composition 6 (PSA6)

A pressure-sensitive adhesive composition was prepared according to the method of Pressure-Sensitive Adhesive Composition 1 with the exception that the amount of each component was altered to achieve a pressure-sensitive adhesive composition with the MW PDMS diamine (/1000)/moles Dytek A polyamine/% by weight MQ resin of 5/0.5/50.

Pressure-Sensitive Adhesive Composition 7 (PSA7)

A pressure-sensitive adhesive composition was prepared according to the method of Pressure-Sensitive Adhesive Composition 1 with the exception that the amount of each component was altered to achieve a pressure-sensitive adhesive composition with the MW PDMS diamine (/1000)/moles Dytek A polyamine/% by weight MQ resin of 33/2/50.

Pressure-Sensitive Adhesive Composition 8 (PSA8)

In a glass reaction bottle was placed 146.47 grams isooctyl acrylate, 11.03 grams glacial acrylic acid (available from Dow Chemical, Michigan), 192.0 grams of ethyl acetate and 0.24 grams of VAZO 64 2,2'-azobis(isobutyronitrile) free radical initiator (E.I. DuPont Company, Delaware). The reaction bottle and contents were purged with one liter per minute nitrogen for two minutes and sealed. The reaction bottle was placed in a 55° C. bath and tumbled therein for 24 hours. An additional 255.53 grams of heptane was added to the polymer for dilution with measured solids equal to 25.23%. The inherent viscosity of the polymer measured in ethyl acetate was 1.64 dl/g.

Pressure-Sensitive Adhesive Composition 9 (PSA9)

In a glass reaction bottle was placed 180.0 grams isooctyl acrylate, 20.0 grams glacial acrylic acid (available from Dow Chemical, Michigan), 234.78 grams of ethyl acetate and 0.20 grams of benzoyl peroxide free radical initiator (Arkema Inc., Philadelphia, Pa.). The reaction bottle and contents were purged with one liter per minute nitrogen for two minutes and sealed. The reaction bottle was placed in a 60° C. bath and tumbled therein for 24 hours. An additional 341 grams of toluene was added to the polymer for dilution with measured solids equal to 23.68%. The inherent viscosity of the polymer measured in ethyl acetate was 1.75 dl/g.

Control 1

A stretch releasing pressure-sensitive adhesive assembly was prepared by coating a first layer of Pressure-Sensitive Adhesive Composition 1 on the SYL-OFF Q2-7785 treated surface of a SYL-OFF Q2-7786 release liner using a laboratory knife coater. The adhesive was then dried in a force air oven at 70° C. for approximately 15 minutes.

Example 1

A multi-layer stretch releasing pressure-sensitive adhesive assembly was prepared by coating a first layer of Pressure-Sensitive Adhesive Composition 1 on the SYL-OFF Q2-7785 treated surface of a SYL-OFF Q2-7785 release liner using a laboratory knife coater at a first knife coater station. The coated release liner was then passed to a second knife coating station where a layer of Pressure-Sensitive Adhesive Composition 2 was knife coated on the surface of the first layer while the adhesive composition of the first layer was still wet. The construction was then dried in a force air oven at 70° C. for approximately 15 minutes to form a multi-layer assembly that included a 1.5 mil layer of the Pressure-Sensitive Adhesive Composition 1 and a 1.5 mil layer of Pressure-Sensitive Adhesive Composition 2.

Example 2

A multi-layer stretch releasing pressure-sensitive adhesive assembly was prepared by coating a first layer of Pressure-Sensitive Adhesive Composition 1 on the SYL-OFF Q2-7785 surface of a SYL-OFF Q2-7785 release liner using a laboratory knife coater at a first knife coater station. The layer of pressure-sensitive adhesive composition 1 was then dried to form a film. Pressure-Sensitive Adhesive Composition 2 was then knifed coated on the surface of the dried first layer. The multi-layer assembly was then dried in a force air oven at 70° C. for approximately 10 minutes to form a multi-layer assembly that included a 1.5 mil layer of Pressure-Sensitive Adhesive Composition 1 and a 1.5 mil layer of Pressure-Sensitive Adhesive Composition 2. A second SYL-OFF Q2-7785 release liner was then placed on the exposed surface of the layer of Pressure-Sensitive Adhesive Composition 2.

Figure 6:
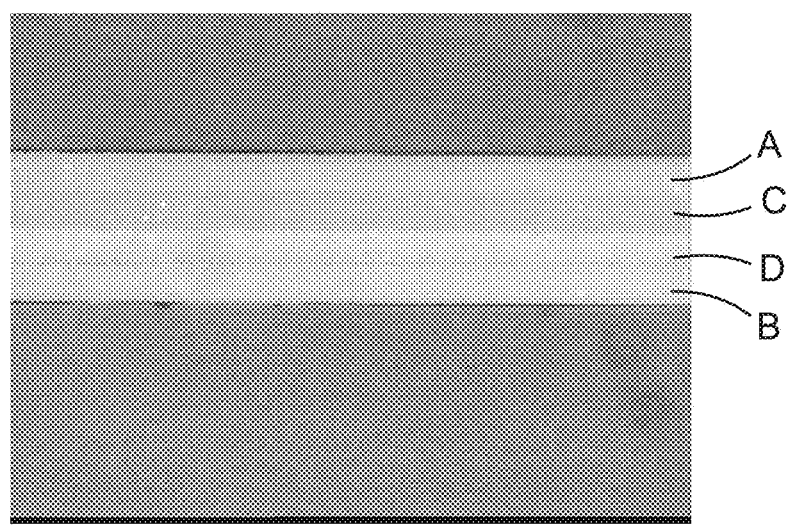
FIG. 6 is a photomicrograph of one embodiment of a multi-layer pressure-sensitive adhesive assembly.

Using a Vision-Gauge video microscope, a digital image is obtained to record the presence of two interfacial separated adhesive layers of Example 2. The photomicrograph image shown in FIG. 6 depicts four distinct layers of a multi-layer assembly prepared according to Example 2. The two outer layers, A, B, are the SYL-OFF Q2-7785 release liners, the first inner layer, C, is Pressure-Sensitive Adhesive Composition 1 and the second inner layer, D, is Pressure-Sensitive Adhesive Composition 2.

Example 3

A multi-layer stretch releasing pressure-sensitive adhesive assembly was prepared by coating Pressure-Sensitive Adhesive Composition 2 on the SYL-OFF Q2-7785 surface of a SYL-OFF Q2-7785 release liner using a laboratory knife coater. The Pressure-Sensitive Adhesive Composition 2 was then dried to form a first film. A wet Pressure-Sensitive Adhesive Composition 1 was then coated on the surface of the dried layer of Pressure-Sensitive Adhesive Composition 2 using a laboratory knife coater. The layer of Pressure-Sensitive Adhesive Composition 1 was then dried to form a multi-layer assembly that included a 1.5 mil layer of Pressure-Sensitive Adhesive Composition 1 and a 1.5 mil layer of Pressure-Sensitive Adhesive Composition 2.

Example 4

A multi-layer pressure-sensitive adhesive assembly prepared according to the method of Example 2 was laminated onto a 36 mil multi-layer composite foam laminate backing through the pressure-sensitive adhesive composition of the second layer, i.e., Pressure-Sensitive Adhesive Composition 2, to form a stretch releasing pressure-sensitive adhesive assembly.

The multi-layer assembly of Example 4 was tested according to the Static Shear Test Method and exhibited >45,000 minutes to glass substrate at room temperature (about 72° F.), >45,000 minutes to painted drywall substrate at room temperature and >15,000 minutes to a glass substrate at 90° F. and 90% relative humidity. The multi-layer assembly of Example 4 was also tested for stretch release force and clean removal properties and exhibited clean removal from a painted drywall substrate and a glass substrate. The sample strips exhibited a stretch debond force to a glass surface of 69.9 oz/0.625 inch width. Normal tensile testing of the multi-layer assembly of Example 4 resulted in foam rupture, i.e. >100 lb/in$^2$ force. For each test, the release liner was removed from the assembly and the assembly was adhered to the test substrate through the pressure-sensitive adhesive composition of the first layer, i.e., Pressure-Sensitive Adhesive Composition 1.

Examples 5-10

A series of multi-layer pressure-sensitive adhesive assemblies were prepared using a two layer slot feed knife die or a three layer slot feed knife die and pressure-sensitive adhesive compositions 1-3 and elastomer composition 1 above. The layer combinations, the thicknesses (in mils) and the ratios of the layers to each other are set forth in Table 1. Layer 1 of each multi-layer assembly was coated directly onto the SYL-OFF Q2-7785 surface of a polycoated release liner. The polycoated release liner was a 35 pound bleached paper sandwiched between two high density polyethylene corona treated film layers. Layers 1-3 were simultaneously coated from solvent with the individual gap size and pump rate defined based on the target dry thickness and weight % solids of the adhesive. The coated web traveled at a speed of 1.5 meters/minute through a first oven zone, which was 5 feet in length at a temperature of 65° C., and then through a second oven zone, which was 5 feet in length at a temperature of 82° C. The air velocity was 20 meters/second.

The multi-layer pressure-sensitive adhesive assemblies were then laminated onto 36 mil multi-layer composite foam laminate backings through the exterior most adhesive layer, i.e., layer 2 in the dual pressure-sensitive adhesive layer assemblies and layer 3 in the tri-pressure-sensitive adhesive assemblies, to form a stretch releasing pressure-sensitive adhesive assembly.

The multi-layer pressure-sensitive adhesive assemblies of Examples 5-10 were tested according to the Static Shear Test Method for load bearing properties on glass at 90° F. and 90% relative humidity, as well as on painted drywall at 72° F. The stretch releasing pressure-sensitive adhesive assemblies where tested by removing the release liner and bonding the multi-layer assembly to the test substrate through Pressure-Sensitive Adhesive Composition 1. The results are reported in units of minutes in Table 2 and reflect an average of 6 samples, with the exception that the adhesive properties to glass at 90° F. and 90% relative humidity are the result of 8 samples.

TABLE 1

| Example | Die Layers | Total Thickness | Layer Ratio | Adhesive Layer 1 | Adhesive Layer 2 | Adhesive Layer 3 |
|---|---|---|---|---|---|---|
| 5 | dual layer | 2.83 mils | 50/50 | PSA1 | PSA2 | NA |
| 6 | dual layer | 2.28 mils | 20/80 | PSA1 | PSA2 | NA |
| 7 | dual layer | 2.83 mils | 50/50 | PSA1 | PSA3 | NA |
| 8 | dual layer | 2.79 mils | 80/20 | PSA1 | PSA3 | NA |
| 9 | tri layer | 2.00 mils | 20/60/20 | PSA1 | EC1 | PSA2 |
| 10 | tri layer | 2.06 mils | 8/53/39 | PSA1 | EC1 | PSA2 |

NA = not applicable

TABLE 2

| | Static Shear Painted Drywall at CTH | | Static Shear Glass at 90° F./90% RH | |
|---|---|---|---|---|
| Example | Minutes | Failure Mode | Minutes | Failure Mode |
| 5 | >45,000 | NA | >20,000 | NA |
| 6 | NT | NA | NT | NA |
| 7 | >45,000 | NA | >20,000 | NA |
| 8 | >45,000 | NA | >20,000 | NA |
| 9 | 7738 | Adhesive interlayer failure. | NT | NA |

TABLE 2-continued

|  | Static Shear Painted Drywall at CTH | | Static Shear Glass at 90° F./90% RH | |
|---|---|---|---|---|
| Example | Minutes | Failure Mode | Minutes | Failure Mode |
| 10 | 12766 | Adhesive interlayer failure. | 5307 | Adhesive interlayer failure. |

NT = not tested
CTH = controlled temperature 72° F., relative humidity 50%
RH = Relative Humidity Examples 11-16

Sample Preparation Method 1

A multi-layer stretch releasing pressure-sensitive adhesive composition assembly was prepared by coating a first layer of pressure-sensitive adhesive composition on a first surface of a first release liner using a laboratory knife coater. The layer of pressure-sensitive adhesive composition was then dried to form a first film and the thickness of the first film was recorded in mils. A second layer of pressure-sensitive adhesive composition was knife coated on the first surface of a second release liner using a laboratory knife coater and dried to form a second film and the thickness of the second film was recorded in mil. The pressure-sensitive adhesive layer of the first film was then dry laminated onto the pressure-sensitive adhesive layer of the second film with 25 pounds per square inch (psi) pressure to form a multi-layer assembly that included the dry first layer of pressure-sensitive adhesive composition and the dry second layer of pressure-sensitive adhesive composition. Subsequently, the multi-layer pressure-sensitive adhesive assembly was laminated onto each side of a 36 mils multi-layer composite foam laminate backing through the pressure-sensitive adhesive composition of the second layer to form a stretch releasing pressure-sensitive adhesive assembly. Multi-layer stretch releasing pressure-sensitive adhesive strips were die-cut from the multi-layer adhesive assembly and tested by removing the release liner and bonding the multi-layer assembly to a surface through the pressure-sensitive adhesive composition of the first layer.

Sample Preparation Method 2

Specimen A

A multi-layer stretch releasing pressure-sensitive adhesive assembly was prepared by coating a first pressure-sensitive adhesive composition on a first surface of a first release liner (RL1) using a laboratory knife coater. The first pressure-sensitive adhesive composition was then dried to form a first adhesive layer and the thickness of the first adhesive layer was recorded in mil. A second pressure-sensitive adhesive composition was separately knife coated on the surface of a 1.5 mils PET film and dried to form a second adhesive layer and the thickness of the second adhesive layer was recorded in mils. The first adhesive layer was then dry laminated onto the second adhesive layer with 25 psi pressure to form a multi-layer assembly that included the first adhesive layer and the second adhesive layer.

Specimen B

Separately a multi-layer stretch releasing pressure-sensitive adhesive assembly was prepared by coating a first pressure-sensitive adhesive composition on a 1.5 mils PET film using a laboratory knife coater. The first pressure-sensitive adhesive composition was then dried to form a first adhesive layer and the thickness of the first adhesive layer was recorded in mils. Then a second pressure-sensitive adhesive composition was separately knife coated on a first surface of a second release liner and dried to form a second adhesive layer and the thickness of the second adhesive layer was recorded in mil. The first adhesive layer was then dry laminated onto the second adhesive layer of the second film with 25 psi pressure to form a multi-layer assembly that included the first adhesive layer and the second adhesive layer. Next the second release liner was removed from the second adhesive layer and a third release liner (RL3) was dry laminated to the exposed adhesive surface of the second adhesive layer.

Multi-layer stretch releasing pressure-sensitive adhesive assemblies of Examples 11, 13 and 15 were prepared according to Sample Preparation Method 1. Multi-layer stretch releasing pressure-sensitive adhesive assemblies of Examples 12A, 12B, 14A, 14B, 16A and 16B were prepared according to Sample Preparation Method 2. The pressure-sensitive adhesive compositions, the dry adhesive layer thickness, and release liners of each of the assemblies of Examples 11-16 are set forth in Table 3.

TABLE 3

| Example | First Adhesive | Thickness (mil) | First Release Liner (RL1) | Second Adhesive | Thickness (mil) | Second Release Liner | Third Release Liner (RL3) |
|---|---|---|---|---|---|---|---|
| 11 | PSA1 | 1.34 | 7786 | PSA2 | 1.49 | 7785 | NA |
| 12A | PSA1 | 1.09 | 7786 | PSA2 | 1.31 | 1.5 mil PET | NA |
| 12B | PSA1 | 1.61 | 1.5 mil PET | PSA2 | 1.00 | 7786 | 7785 |
| 13 | PSA1 | 1.34 | 7786 | PSA4 | 1.42 | 7785 | NA |
| 14A | PSA1 | 1.09 | 7786 | PSA4 | 1.51 | 1.5 mil PET | NA |
| 14B | PSA1 | 1.61 | 1.5 mil PET | PSA4 | 1.02 | 7786 | 7785 |
| 15 | PSA1 | 1.34 | 7786 | PSA5 | 1.65 | 7785 | NA |
| 16A | PSA1 | 1.09 | 7786 | PSA5 | 1.19 | 1.5 mil PET | NA |
| 16B | PSA1 | 1.61 | 1.5 mil PET | PSA5 | 0.96 | 7786 | 7785 |

Example 11

The adhesive strips of Example 11 were tested according to the stretch release debond force and static shear test methods. The sample strips exhibited: a stretch debond force to a glass surface of 66.4 oz/0.625 inch width, 475% elongation and clean removal with slight adhesive ghosting; a stretch debond force to a painted drywall surface of 69.7 oz/0.625 inch width, 500% elongation and clean removal; and a static shear to painted drywall at 72° F. room temperature and 50% relative humidity of greater than 57,515 minutes and to glass at 72° F. and 50% relative humidity of greater than 57,515 minutes.

Strips from Control 1 were aged at 120° F. for a period of 88 days. At periodic intervals the release force of the pressure-sensitive adhesive composition 1 to the SYLOFF-7785 surface of the SYLOFF-7786 release liner was measured according to the Release Force test method. The release force is reported in units of grams per 0.5 inch width in Table 4.

TABLE 4

| | Control 1 | | | | | | | | | | | | |
|---|---|---|---|---|---|---|---|---|---|---|---|---|---|
| | Days | | | | | | | | | | | | |
| | 0.1 | 5 | 7 | 11 | 18 | 25 | 32 | 39 | 46 | 67 | 74 | 81 | 88 |
| PSA1:RL1 | 7.5 | 18.5 | 27.5 | 43.0 | 61.5 | 83.0 | 106.5 | 121.0 | 142.5 | 160.5 | 155.0 | 184 | 200 |

Figure 7:
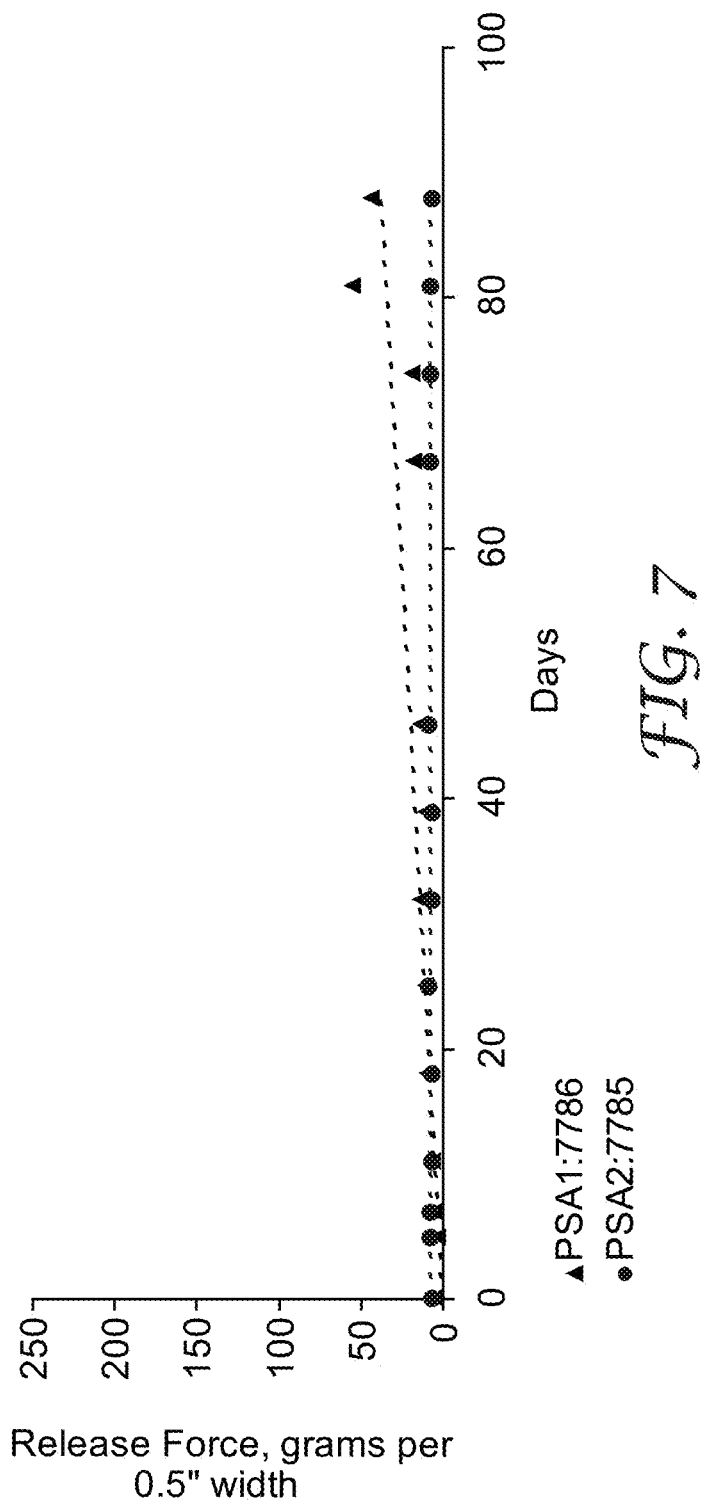
FIG. 7 is a plot of release force in grams per 0.5 inch width versus number of days for the multi-layer pressure-sensitive adhesive assembly of Examples 12A and 12B.
Figure 8:
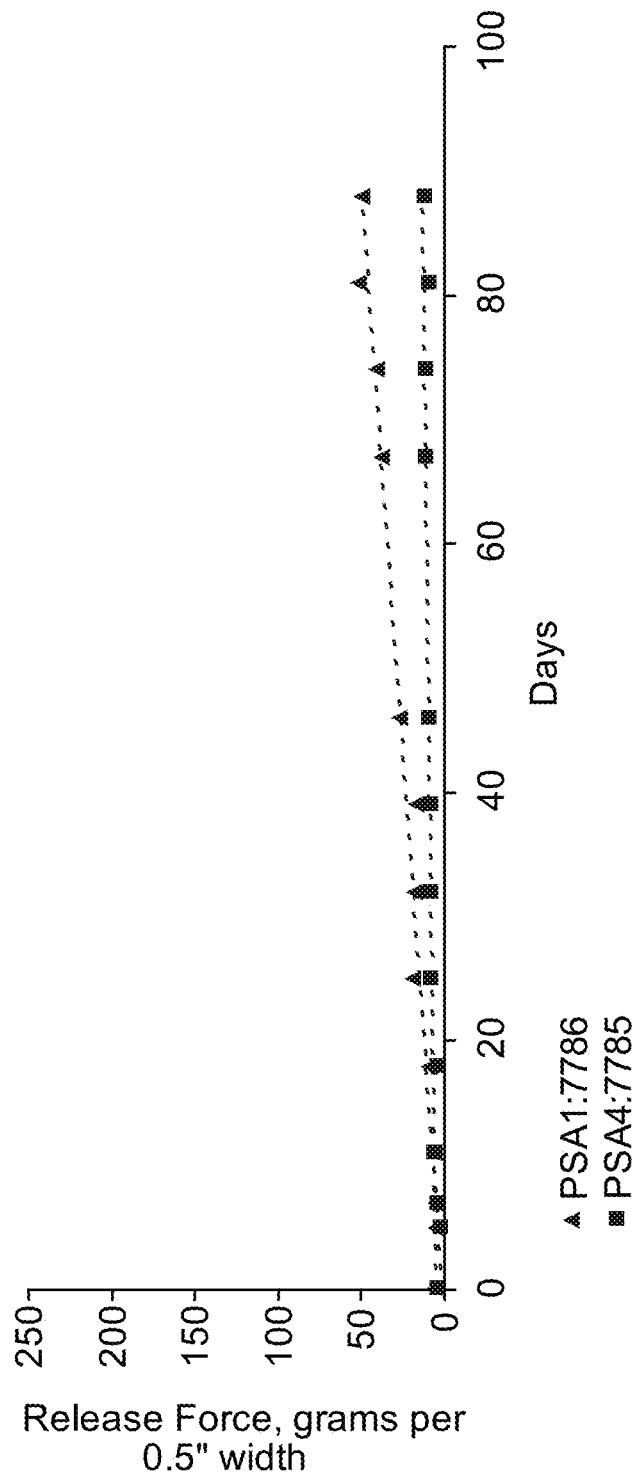
FIG. 8 is a plot of release force in grams per 0.5 inch width versus number of days for the multi-layer pressure-sensitive adhesive assembly of Examples 14A and 14B.
Figure 9:
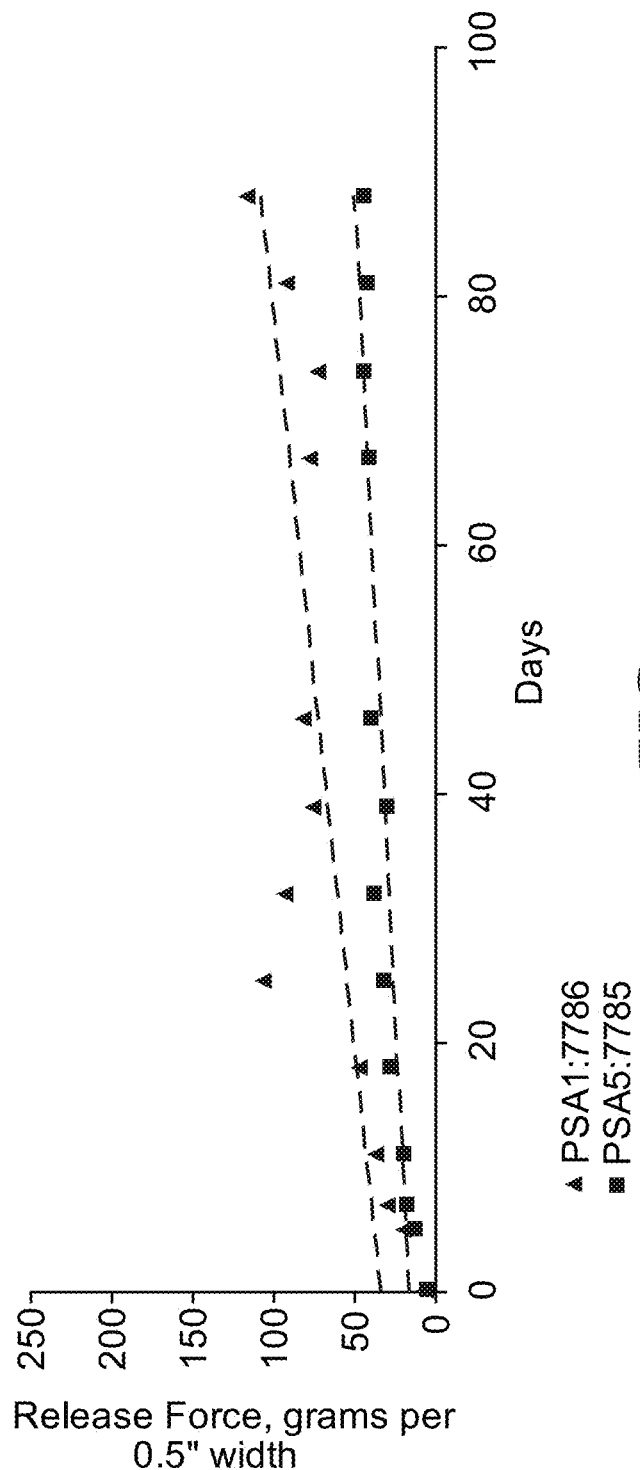
FIG. 9 is a plot of release force in grams per 0.5 inch width versus number of days for the multi-layer pressure-sensitive adhesive assembly of Example 16A and 16B.

Strips from each multi-layer stretch releasing pressure-sensitive adhesive assembly of Examples 12, 14 and 16 were aged at 120° F. for a period of 88 days. At periodic intervals the release force of the first pressure-sensitive adhesive layer to the first release liner of each Specimen A of Examples 12, 14 and 16, and the release force of the second pressure-sensitive adhesive layer to the third release liner of each Specimen B of Examples 12, 14 and 16 was measured according to the Release Force test method and the release differential was calculated. The results for Examples 12A and 12B, 14A and 14B, and 16A and 16B, are reported in units of grams per 0.5 inch width in Tables 5-7, respectively, and plotted as release force in grams per 0.5 inch width versus number of days in FIGS. 7-9, respectively. The ratio of the first recorded release force to the second recorded release force is set forth in Tables 5-7 as the differential.

Example 13

The adhesive strips of Example 13 were tested according to the stretch release debond force and static shear test methods. The sample strips exhibited: a stretch debond force to a glass surface of 65.7 oz/0.625 inch width, a 496% elongation and clean removal with slight ghosting; a stretch debond force to a painted drywall surface of 66.8 oz/0.625 inch width, a 488% elongation and clean removal; and a static shear to painted drywall at 72° F. room temperature and 50% relative humidity of greater than 57,515 minutes and to glass at 72° F. room temperature and 50% relative humidity of greater than 57,515 minutes.

TABLE 5

| | Examples 12A and 12B | | | | | | | | | | | | |
|---|---|---|---|---|---|---|---|---|---|---|---|---|---|
| | Days | | | | | | | | | | | | |
| | 0.1 | 5 | 7 | 11 | 18 | 25 | 32 | 39 | 46 | 67 | 74 | 81 | 88 |
| PSA1:RL1 | 5.7 | 3.0 | 5.0 | 6.5 | 9.0 | 10.5 | 13.0 | 10.5 | 13.0 | 17.5 | 19.0 | 54.5 | 44.0 |
| PSA2:RL3 | 6.0 | 7.5 | 7.5 | 6.5 | 6.5 | 8.0 | 6.0 | 6.5 | 8.5 | 7.5 | 7.5 | 7.0 | 6.0 |
| Differential* | 1:1 | 1:2 | 1:1 | 1:1 | 1:1 | 1:1 | 2:1 | 2:1 | 2:1 | 2:1 | 3:1 | 8:1 | 7:1 |

*These values are rounded for simplicity in reporting. The actual values are per the calculation.

TABLE 6

| | Examples 14A and 14B | | | | | | | | | | | | |
|---|---|---|---|---|---|---|---|---|---|---|---|---|---|
| | Days | | | | | | | | | | | | |
| | 0.1 | 5 | 7 | 11 | 18 | 25 | 32 | 39 | 46 | 67 | 74 | 81 | 88 |
| PSA1:RL1 | 5 | 4.5 | 5.0 | 6.0 | 9.0 | 18.5 | 17.5 | 17.0 | 27.0 | 37.5 | 40.5 | 51.0 | 49.0 |
| PSA4:RL3 | 5 | 3.0 | 5.0 | 6.5 | 4.5 | 8.5 | 8.5 | 8.5 | 10.0 | 12.0 | 11.5 | 10.0 | 12.5 |
| Differential | 1:1 | 2:1 | 1:1 | 1:1 | 2:1 | 2:1 | 2:1 | 2:1 | 3:1 | 3:1 | 4:1 | 5:1 | 4:1 |

*These values are rounded for simplicity in reporting. The actual values are per the calculation.

TABLE 7

| | Examples 16A and 16B | | | | | | | | | | | | |
|---|---|---|---|---|---|---|---|---|---|---|---|---|---|
| | Days | | | | | | | | | | | | |
| | 0.1 | 5 | 7 | 11 | 18 | 25 | 32 | 39 | 46 | 67 | 74 | 81 | 88 |
| PSA1:RL1 | 6.5 | 19.0 | 30.0 | 36.5 | 46.5 | 106.5 | 92.5 | 75.5 | 82.0 | 78.0 | 72.0 | 91.5 | 116.5 |
| PSA5:RL3 | 6.0 | 13.5 | 18.5 | 20.0 | 28.5 | 33.0 | 38.5 | 30.5 | 40.5 | 42.0 | 45.0 | 43.0 | 45.0 |
| Differential | 1:1 | 1:1 | 2:1 | 2:1 | 2:1 | 3:1 | 2:1 | 2:1 | 2:1 | 2:1 | 2:1 | 2:1 | 3:1 |

*These values are rounded for simplicity in reporting. The actual values are per the calculation.

Example 15

The adhesive strips of Example 15 were tested according to the stretch release debond force and static shear test methods. The sample strips exhibited: a stretch debond force to a glass surface of 66.6 oz/0.625 inch width, 458% elongation and clean removal with slight ghosting; a stretch debond force to a painted drywall surface of 67.6 oz/0.625 inch width, 454% elongation and clean removal; and a static shear to painted drywall at 72° F. room temperature and 50% relative humidity of greater than 57,515 minutes and to glass at 72° F. room temperature and 50% relative humidity of greater than 57,515 minutes.

Examples 17-19

Examples 17A, 19A and 19B were prepared according to the method of Example 2 with the exception that the pressure-sensitive adhesive compositions of the first and second layers and the release liners used were as set forth in Table 8.

Example 17B was prepared according to the method of Example 3 with the exception that the pressure-sensitive adhesive compositions of the first and second layers and the release liners used were as set forth in Table 8.

Examples 17C, 17D, 18A, 18B, 18C, were prepared according to the method of Example 1 with the exception that the pressure-sensitive adhesive compositions of the first and second layers and the release liners used were as set forth in Table 8.

Example 17E

The multi-layer stretch releasing pressure-sensitive adhesive assembly of Example 17E was prepared by coating a first layer of Pressure-Sensitive Adhesive Composition 1 on the SYL-OFF Q2-7785 surface of a SYL-OFF Q2-7786 release liner. The layer of Pressure-Sensitive Adhesive Composition 1 was then dried to form a first film. Then Pressure-Sensitive Adhesive Composition 2 was knife coated on the surface of a silicone treated release liner and dried to form a second film. The pressure-sensitive adhesive layer of the first film was then dry laminated onto the pressure-sensitive adhesive layer of the second film with 25 psi pressure to form a multi-layer assembly having a total pressure-sensitive adhesive thickness of 2.43 mil.

TABLE 8

| Example | First Adhesive Layer | Thickness (mil) | First Release Liner (RL1) | Second Adhesive Layer | Thickness (mil) | Second Release Liner |
|---|---|---|---|---|---|---|
| 17A | PSA1 | 1.63 | 7785 | PSA2 | 1.17 | NA |
| 17B | PSA2 | 1.23 | Silicone | PSA1 | 1.32 | NA |
| 17C | PSA2 | 1.47 | Silicone | PSA1 | 1.24 | NA |
| 17D | PSA1 | 1.31 | 7785 | PSA2 | 1.67 | NA |
| 17E | PSA1 | 1.23 | 7785 | PSA2 | 1.20 | Silicone |
| 18A | PSA1 | ND | 7785 | PSA7 | 3.04* | NA |
| 18B | PSA1 | ND | 7785 | PSA5 | 2.91* | NA |
| 18C | PSA1 | ND | 7785 | PSA6 | 2.32* | NA |
| 19A | PSA1 | 1.52 | 7785 | PSA9 | 1.15 | NA |
| 19B | PSA1 | 1.52 | 7785 | PSA8 | 1.17 | NA |

*Total thickness of the first and second adhesive layers

The multi-layer stretch releasing pressure-sensitive adhesive assemblies of Examples 17-19 were tested according to the Peel Adhesion test method and Stretch Release and Static Shear test methods on glass and painted drywall test substrates. For all tests the layer of PSA1 was in contact with the test substrate. The static shear test conditions were approximately 72° F. and approximately 50% relative humidity for painted dry wall and 90° F. and 90% relative humidity for the glass substrate. The results, including visual observations regarding the cleanliness of the removal, are reported in Table 9 in units of ounce (oz.) per 0.5 inch width for peel adhesion, oz./0.625 inch width for release force and percent for elongation.

TABLE 9

| | | Stretch Release Properties | | | | | | Static Shear | |
|---|---|---|---|---|---|---|---|---|---|
| | | Glass | | | Painted Dry wall | | | | |
| Example | Peel Adhesion | Release Force | Elongation | Clean Removal | Release Force | Elongation | Clean Removal | Painted Drywall | Glass |
| 17A | 47.1 | 60.4 | 396 | Clean Removal | 55.9 | 414 | Clean Removal | >220,205 | >38880 |
| 17B | 17.5 | 71.9 | 442 | Clean Removal | 78.2 | 460 | Clean Removal | >220,205 | >38880 |
| 17C | 6.5 | 70.9 | 429 | Clean Removal[1] | 70.9 | 458 | Clean Removal | 8 (2-bond) | NT |
| 17D | 24.9 | 60.9 | 450 | Clean Removal[2] | NT | NT | NT | <1 (Adhesion) | NT |
| 17E | 34.1 | 64.1 | 488 | Clean Removal | 68 | 533 | Clean Removal | >220,205 | >38,880 |
| 18A | NT | 65.0 | 438 | Clean Removal | 67.3 | 463 | Clean Removal | >190,017 | >38,880 |
| 18B | NT | 64.2 | 442 | Clean Removal | 66.8 | 450 | Clean Removal | >190,017 | >38,880 |
| 18C | NT | NT | NT | NT | NT | NT | NT | >82,651[3] | >13,971[4] |
| 19A | NT | 62.9 | 488 | Clean Removal | 61.6 | 471 | Clean Removal | NT | 1601 |
| 19B | NT | 62.3 | 538 | Clean Removal | 65.2 | 513 | Clean Removal | NT | 2786 |

NT = Not Tested
[1] light ghosting,
[2] ghosting,
[3] 2 samples out of 6 failed,
[4] 5 samples out of 6 failed.
Ghosting refers to a partially visible outline of the adhesive strip.

Other embodiments are within the claims. Although the multi-layer pressure-sensitive adhesive assembly has been described as including two and three layers of various combinations of pressure-sensitive adhesive compositions and elastomeric compositions, the assembly can include any number of layers of compositions in any combination.

What is claimed is:

1. A multi-layer assembly comprising:
   a release liner comprising
      a first major surface,
      a second major surface, a first release agent on the first major surface of the release liner, the first release agent comprising the reaction product of a fluorosilicone polymer comprising at least about 35% fluorine substitution and an organohydrogenpolysiloxane crosslinking agent, and a second release agent on the second major surface of the release liner;

a first layer comprising a pressure-sensitive adhesive composition disposed upon and in contact with the first release agent on the first major surface of the release liner, the pressure-sensitive adhesive composition comprising silicone polyurea block copolymer; and a second layer comprising a pressure-sensitive adhesive composition comprising an elastomer disposed upon and in contact with the first layer, the composition of the pressure-sensitive adhesive composition of the second layer being different from the composition of the pressure-sensitive adhesive composition of the first layer, the first layer of the multi-layer assembly exhibiting a release force to the release liner of no greater than 100 grams per 0.5 inch width after the multi-layer assembly has been stored for 46 days at 120° F.

2. The multi-layer assembly of claim 1, wherein the release liner comprises a layer of film and a coating comprising a fluorosilicone moiety disposed on a surface of the film having the first and second major surfaces, the first layer of the multi-layer assembly being in contact with the coating of the release liner.

3. The multi-layer assembly of claim 1, further comprising a backing, the second layer being disposed on the backing.

4. The multi-layer assembly of claim 3, wherein the backing comprises foam.

5. The multi-layer assembly of claim 3, wherein the backing comprises a composite comprising a layer of foam comprising a first major surface and a second major surface, a first layer of film bonded to the first major surface of the layer of foam, and a second layer of film bonded to the second major surface of the layer of foam.

6. The multi-layer assembly of claim 1, further comprising a nontacky tab.

7. The multi-layer assembly of claim 1, wherein the second release agent comprises the reaction product of a fluorosilicone polymer and an organohydrogenpolysiloxane crosslinking agent disposed on a second major surface of the release liner, the reaction product on the second major surface of the release liner being different from the reaction product on the first major surface of the release liner.

8. The multi-layer assembly of claim 7, wherein the fluorosilicone polymer of the first release agent comprises at least about 42% fluorine substitution.

9. A method of using a stretch releasing pressure-sensitive adhesive assembly comprising:
providing the multi-layer assembly of claim 1;
removing said release liner from the article; and
adhering said assembly to a surface through the pressure-sensitive adhesive composition of the first layer, said assembly is cleanly removable from the surface through stretching without damaging the surface.

10. A method of using a stretch releasing pressure-sensitive adhesive assembly comprising:
providing the multi-layer assembly of claim 1;
providing a backing comprising a first major surface and a second major surface opposite the first major surface;
bonding the multi-layer assembly of claim 1 to the backing, such that the second layer of the multi-layer assembly of claim 1 is bonded to the first major surface of the backing,
removing the release liner from the formed stretch releasing pressure-sensitive adhesive assembly; and
adhering the formed stretch releasing pressure-sensitive adhesive assembly to a surface through the pressure-sensitive adhesive composition of the first layer, the assembly being cleanly removable from the surface through stretching without damaging the surface.

11. The method of claim 10, further comprising bonding a second multi-layer assembly to the second major surface of the backing, the second multi-layer assembly comprising
a release liner,
a first layer comprising a pressure-sensitive adhesive composition on the release liner of the second multi-layer assembly, and
a second layer comprising a composition comprising an elastomer on the first layer of the second multi-layer assembly.

12. The method of claim 11, wherein the pressure-sensitive adhesive composition of the first layer of the second multi-layer assembly comprises a silicone polymer selected from the group consisting of silicone polyurea block copolymers, polydiorganosiloxane diamine, polysiloxane grafted copolymers, and combinations thereof.

13. The method of claim 11, wherein the first layer of the second multi-layer assembly exhibits a release force to the release liner of the second multi-layer assembly of no greater than 100 g per 0.5 inch width after the second multi-layer assembly has been stored for 46 days at 120° F.

14. The method of claim 11, wherein the backing comprises foam and has a first major surface and a second major surface, the second layer of the first multi-layer assembly being on the first major surface of the foam backing and the second layer of the second multi-layer assembly being on the second major surface of the foam backing.

15. A method of using the assembly of claim 1, the method comprising:
removing the release liner to expose the pressure-sensitive adhesive composition of the first layer; and
contacting the exposed pressure-sensitive adhesive composition of the first layer with an object.

* * * * *